United States Patent
Katsumata et al.

(10) Patent No.: US 10,585,308 B2
(45) Date of Patent: Mar. 10, 2020

(54) LIGHT-EMITTING DEVICE

(71) Applicants: CITIZEN WATCH CO., LTD., Nishitokyo-shi, Tokyo (JP); CITIZEN ELECTRONICS CO., LTD., Fujiyoshida-shi, Yamanashi (JP)

(72) Inventors: Toshinobu Katsumata, Fujiyoshida (JP); Takuma Horiuchi, Otsuki (JP)

(73) Assignees: CITIZEN WATCH CO., LTD., Nishitokyo-Shi, Tokyo (JP); CITIZEN ELECTRONICS CO., LTD., Fujiyoshida-Shi, Yamanashi (JP)

( * ) Notice: Subject to any disclaimer, the term of this patent is extended or adjusted under 35 U.S.C. 154(b) by 0 days.

(21) Appl. No.: 16/331,509

(22) PCT Filed: Sep. 12, 2017

(86) PCT No.: PCT/JP2017/032900
§ 371 (c)(1),
(2) Date: Mar. 7, 2019

(87) PCT Pub. No.: WO2018/047975
PCT Pub. Date: Mar. 15, 2018

(65) Prior Publication Data
US 2019/0196271 A1     Jun. 27, 2019

(30) Foreign Application Priority Data
Sep. 12, 2016 (JP) .................. 2016-177612

(51) Int. Cl.
*G02F 1/1335* (2006.01)

(52) U.S. Cl.
CPC .. *G02F 1/133606* (2013.01); *G02F 1/133603* (2013.01); *G02F 1/133605* (2013.01); *G02F 2001/133607* (2013.01)

(58) Field of Classification Search
CPC ......... G02F 1/133606; G02F 1/133605; G02F 1/133603; G02F 2001/133607
(Continued)

(56) References Cited

U.S. PATENT DOCUMENTS 6,598,998 B2 * 7/2003 West ................. H01L 33/58
                                                    257/E33.073
6,647,199 B1 * 11/2003 Pelka .................. G02B 6/0018
                                                      362/23.18
(Continued)

FOREIGN PATENT DOCUMENTS

CN     102278703 A    12/2011
CN     102369608 A     3/2012
(Continued)

OTHER PUBLICATIONS

International Search Report (translation included) and Written Opinion for related PCT App No. PCT/JP2017/032900, dated Dec. 12, 2017, 9 pgs.
(Continued)

*Primary Examiner* — Christopher M Raabe
(74) *Attorney, Agent, or Firm* — Procopio, Cory, Hargreaves & Savitch LLP

(57) ABSTRACT

A light-emitting device comprises a first optical element covering an LED and covered by a second optical element. The first optical element has: a first incident surface on which light emitted from the LED is incident; a recessed first reflecting surface, above the first incident surface, and reflecting to the side the light is incident via the first incident surface from the LED; and a first emitting surface across the periphery of the first reflecting surface, which emits the light from the first reflecting surface. The second optical element has: an incident-reflecting surface formed by, concentric second incident surfaces on which light emitted from the first emitting surface is incident, and second reflecting
(Continued)

surfaces alternately with the second incident surfaces, that reflect upward the light incident on the second incident surfaces; and a second emitting surface above the incident-reflecting surface, that emit light reflected by the second light reflecting surfaces.

9 Claims, 28 Drawing Sheets

(58) Field of Classification Search
USPC .......................................................... 362/277
See application file for complete search history.

(56) References Cited

U.S. PATENT DOCUMENTS

| | | | | |
|---|---|---|---|---|
| 6,924,943 B2* | 8/2005 | Minano | ................... | G02B 3/08 |
| | | | | 359/720 |
| 2008/0186273 A1* | 8/2008 | Krijn | ................... | G02B 6/0021 |
| | | | | 345/102 |
| 2009/0196071 A1* | 8/2009 | Matheson | ............ | G02B 6/0021 |
| | | | | 362/623 |
| 2011/0286221 A1 | 11/2011 | Saito | | |
| 2012/0055552 A1* | 3/2012 | Morgan | ................... | H01L 31/18 |
| | | | | 136/259 |
| 2012/0081907 A1 | 4/2012 | Kato et al. | | |
| 2014/0104816 A1 | 4/2014 | Takasi et al. | | |
| 2014/0211497 A1* | 7/2014 | Yuan | ...................... | F21K 9/233 |
| | | | | 362/555 |
| 2015/0131265 A1 | 5/2015 | Nakamura | | |
| 2017/0160591 A1* | 6/2017 | Cho | ..................... | G02B 5/0257 |

FOREIGN PATENT DOCUMENTS

| | | |
|---|---|---|
| CN | 102789005 A | 11/2012 |
| CN | 104635377 A | 5/2015 |
| JP | H05281402 A | 10/1993 |
| JP | 2004223638 A | 8/2004 |
| JP | 2010239021 A | 10/2010 |
| JP | 2012004095 A | 1/2012 |
| JP | 2013012417 A | 1/2013 |

OTHER PUBLICATIONS

International Preliminary Report on Patentability for related PCT App No. PCT/JP2017/032900 dated Sep. 4, 2018, 12 pgs.
Office Action for related CN App. No. 201780055856.0 dated Jan. 21, 2020; English translation provided. 17 pages.

* cited by examiner

FIG. 20
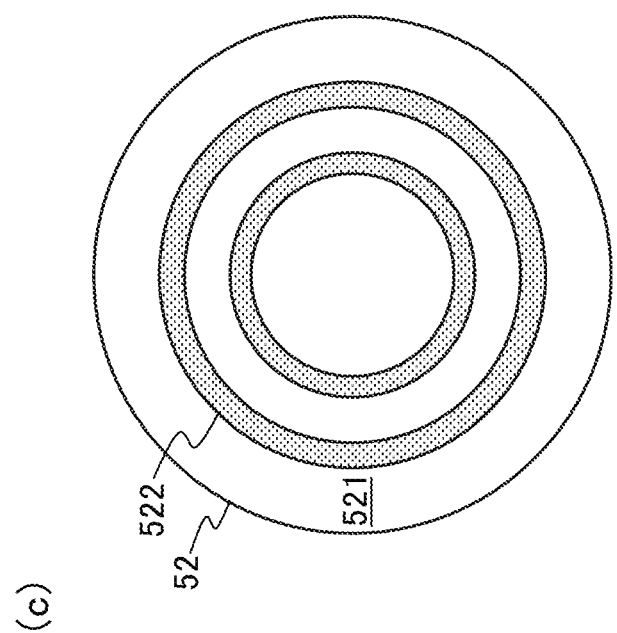
(a)
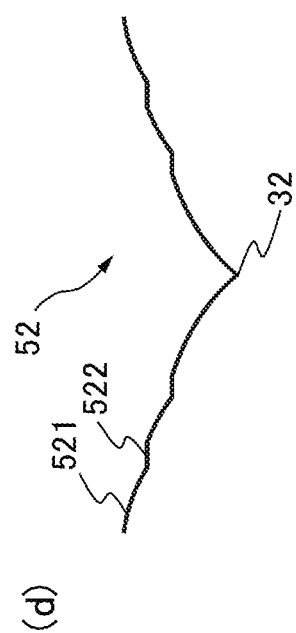
(b)
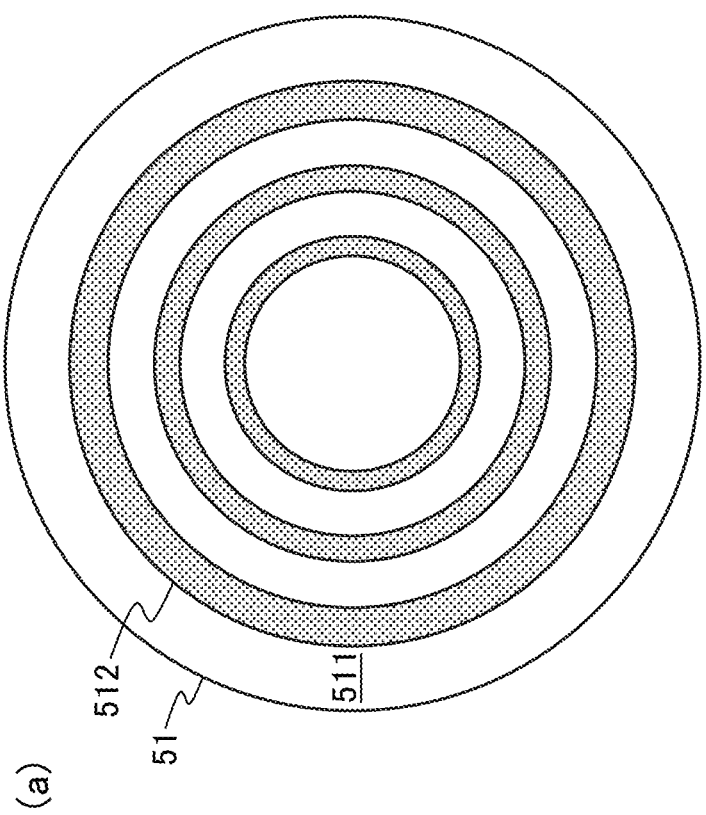
(c)
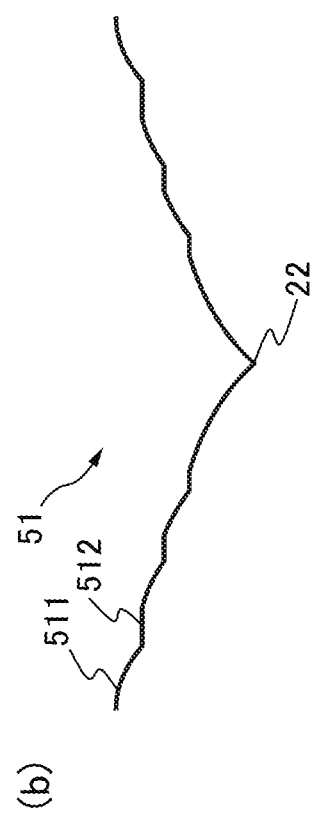
(d)

FIG. 23
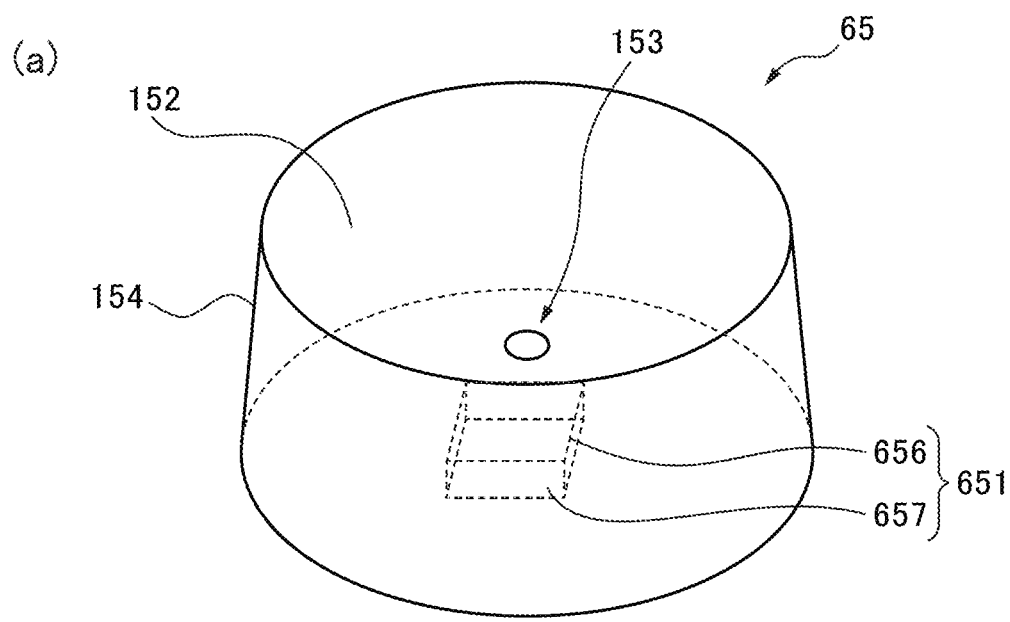
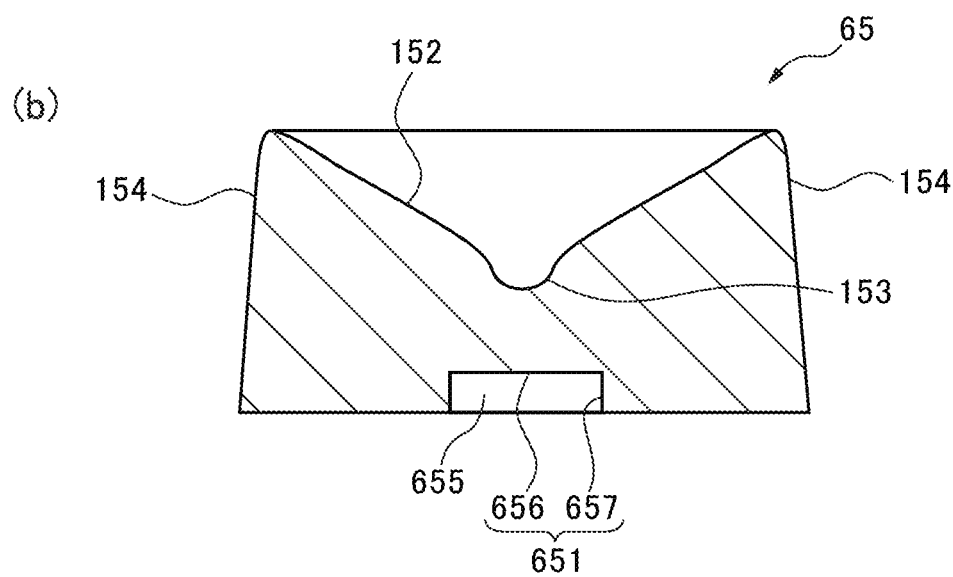

LIGHT-EMITTING DEVICE

CROSS-REFERENCE TO RELATED APPLICATIONS

This application is a U.S. National Stage entry of PCT Application No: PCT/JP2017/032900 filed Sep. 12, 2017, which claims priority to Japanese Patent Application No. 2016-177612, filed Sep. 12, 2016, the contents of which are incorporated herein by reference.

FIELD

The present invention relates to a light-emitting device.

BACKGROUND

A liquid crystal display device has a liquid crystal panel and a light-emitting device that is arranged at the rear of the liquid crystal panel and illuminates the liquid crystal panel from behind. The light-emitting device for a liquid crystal display device is also referred to as a planar light unit or backlight. The light-emitting device for a liquid crystal display device includes a side edge type light-emitting device that causes light that enters from a plurality of LEDs arranged on the side surface of a flat plate-shaped light guide plate to exit from the main surface and a directly under type light-emitting device that directly causes light radiated from a plurality of LEDs arrayed in the form of a plane to travel upward. The side edge type light-emitting device can be easily reduced in thickness and can reduce the number of LEDs that are used by reducing the number of arranged LEDs to a comparatively small number. On the other hand, it is not easy to reduce the size of the directly under type light-emitting device, but it is easy to reduce the weight since no light guide plate is used.

Patent Document 1 describes a light source device that emits light in the form of a plane by arranging a plurality of light-emitting element modules having an LED and a light-diffusing lens in the form of a matrix. The light source device described in Patent Document 1 is characterized in that the light distribution characteristics of adjacent light-emitting element modules are different from each other.

Further, Patent Document 2 describes a backlight system that makes adjustment of a visual field easy as well suppressing a reduction in total efficiency by collimating light that exits from point light sources arranged in the form of an array by a total reflection lens and diffusing the collimated light.

Further, in the directly under type light-emitting device, the contrast of the liquid crystal display device may be improved and power consumption may be reduced by turning off part of the light-emitting areas or turning on only part thereof (hereinafter, called "local dimming"). In recent years, a high display quality obtained in the directly under type display device is also demanded for a medium/small-sized liquid crystal display device whose main stream is the side edge type light-emitting device.

RELATED DOCUMENTS

[Patent Document 1] Japanese Laid Open Patent Document No. 2013-12417
[Patent Document 2] Japanese Laid Open Patent Document No. 2004-223638

SUMMARY

However, if the basic structure of a directly under type light-emitting device adopted in a large-sized liquid crystal display device is simply applied to a medium/small-sized liquid crystal display device, the number of LEDs may increase and exceed that of a side edge type light-emitting device as well as the thickness may become greater than that of the side edge type light-emitting device.

Thus, an object of one aspect is to provide a directly under type light-emitting device capable of reducing the thickness and the number of LEDs to the same level as those of a side edge type light-emitting device even if the directly under type light-emitting device is adopted in a medium/small-sized liquid crystal display device.

A light-emitting device of an embodiment has an LED, a first optical element arranged so as to cover the LED, and a second optical element arranged so as to cover the first optical element, wherein the first optical element has a first incidence surface that light radiated from the LED enters, a first reflection surface having a concave shape, arranged above the first incidence surface, and totally reflecting light laterally that enters from the LED via the first incidence surface, and a first light exit surface arranged along the entire circumference of the first reflection surface and causing light that reflects from the first reflection surface to exit, and the second optical element has an incidence/reflection surface formed by a plurality of second incidence surfaces arranged concentrically and entered by light that exits from the first light exit surface and a plurality of second reflection surfaces arranged alternately with the plurality of second incidence surfaces and totally reflecting light upward that enters the plurality of second incidence surfaces, and a second light exit surface arranged above the incidence/reflection surface and causing light that reflects from the plurality of second reflection surfaces to exit.

In the light-emitting device, the first optical element further has a first bottom portion arranged in opposition to the LED via the first incidence surface, and the first reflection surface includes an inclined surface extending toward an upper side of the first light exit surface from the first bottom portion.

In the light-emitting device, it is preferable that the second optical element further has a second bottom portion arranged in opposition to the LED via the first optical element, and a third incidence surface extending toward an inner edge of the incidence/reflection surface from the second bottom portion and entered by light that transmits at least one of the first reflection surface and the first bottom portion.

In the light-emitting device, it is preferable that the second optical element further has a transmission surface arranged so as to be contained in the third incidence surface and transmitting light that transmits at least one of the first reflection surface and the first bottom portion.

In the light-emitting device, it is preferable that the second optical element further has a third bottom portion arranged in opposition to the LED via the first bottom portion, and a third reflection surface extending toward an inner edge of the second light exit surface from the third bottom portion and reflecting light that enters.

In the light-emitting device, it is preferable that the second optical element further has a transmission surface arranged so as to be contained in the third reflection surface and transmitting light that transmits at least one of the first reflection surface and the first bottom portion.

In the light-emitting device, it is preferable that the LED is arranged by being integrated with the first optical element.

In the light-emitting device, it is preferable that at least part of the plurality of second reflection surfaces reflects light to the outside that enters the plurality of second incidence surfaces, and the second optical element further has a third light exit surface arranged along an outer edge of the second light exit surface and causing light that reflects from at least part of the plurality of second reflection surfaces to exit.

The light-emitting device according to the embodiment converts Lambertian light radiated from an LED into light having many components in the horizontal direction by a wide-angle lens. Thus, the pitch between LEDs may be increased, and therefore the number of LEDs may be reduced. Further, it is not required for the wide-angle lens to perform control of directivity characteristics, and therefore the wide-angle lens may be downsized. Furthermore, by controlling directivity by arranging a TIR Fresnel lens reduced in thickness in advance on the wide-angle lens, the thickness of the light-emitting device may be reduced. As above, even if the light-emitting device according to the embodiment is adopted in a medium/small-sized liquid crystal display device, the thickness and the number of LEDs may be about the same level as those of the side edge type light-emitting device.

BRIEF DESCRIPTION OF DRAWINGS

FIG. 20A is a plan diagram of the third incidence surface illustrated in FIG. 19;

FIG. 20B is an enlarged diagram of the third incidence surface illustrated in FIG. 19;

FIG. 20C is a plan diagram of the third reflection surface illustrated in FIG. 19;

FIG. 20D is an enlarged diagram of the third reflection surface illustrated in FIG. 19;

FIG. 23A is a perspective diagram of the wide-angle lens illustrated in FIG. 23

FIG. 23B is a sectional diagram of the wide-angle lens illustrated in FIG. 23;

and

Figure 27:
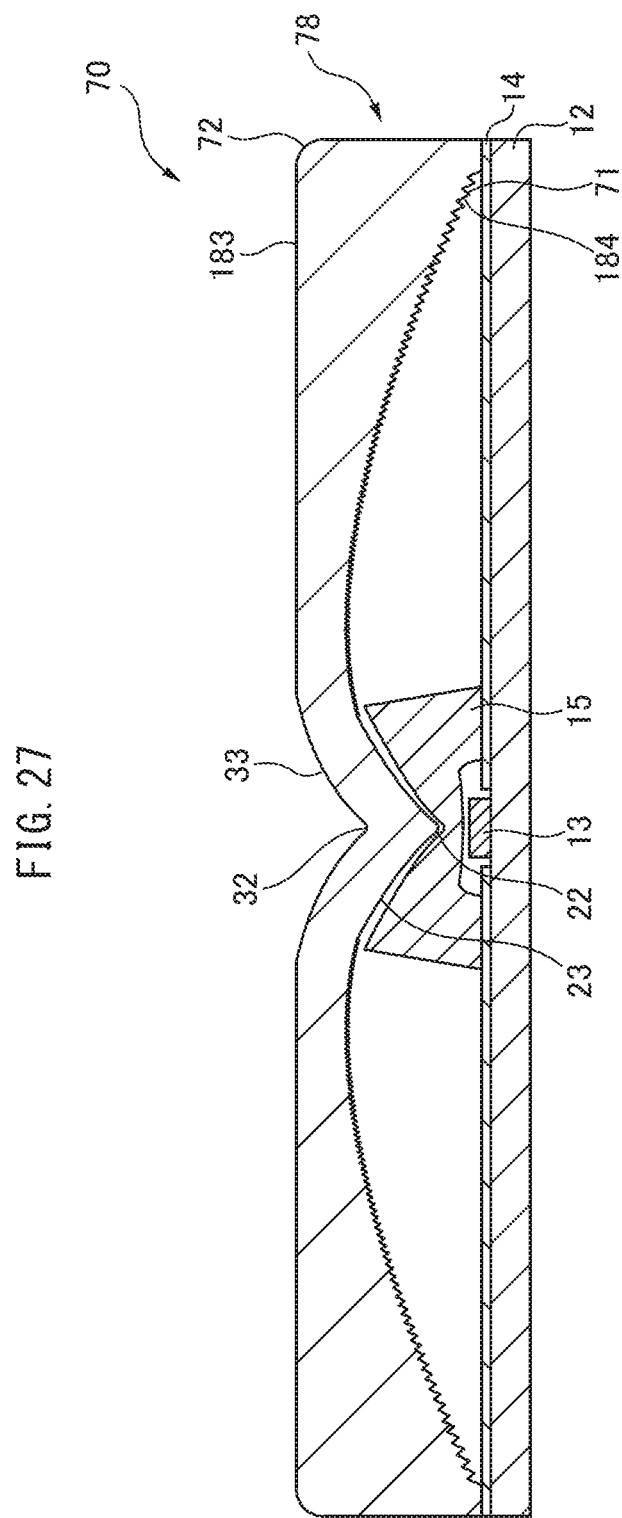
FIG. 27 is a sectional diagram of one optical unit drawn along an AA' line in FIG. 26.
Figure 28:
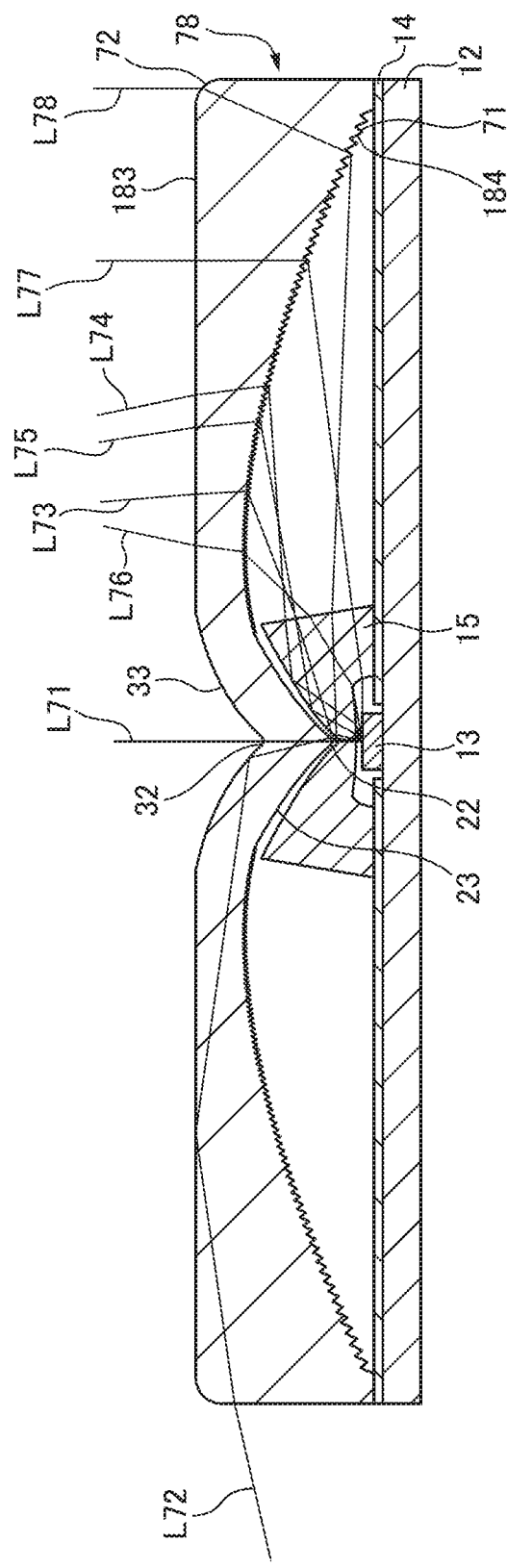

FIG. 28 is a diagram showing light paths of light radiated from the LED in the optical unit illustrated in FIG. 27.

DESCRIPTION OF EMBODIMENTS

In the following, with reference to the attached drawings, the light-emitting devices according to the embodiments are explained in detail. However, the technical scope of the present invention is not limited to those embodiments. In explanation of the drawings, the same symbol is attached to the same or corresponding component and repeated explanation is omitted. The scale or the like of the drawings is changed appropriately for explanation.

The light-emitting device according to the embodiment has an LED, a first optical element arranged so as to cover the LED, and a second optical element arranged so as to cover the first optical element. In one example, the first optical element is a wide-angle lens and the second optical element is a TIR (Total Internal Reflection) Fresnel lens. The light-emitting device according to the embodiment may reduce the size of a hot spot and the amount of light by the first optical element having a first reflection surface that totally reflects light laterally that enters from the LED via a first incidence surface.

(Light-Emitting Device According to First Embodiment)

Figure 1:
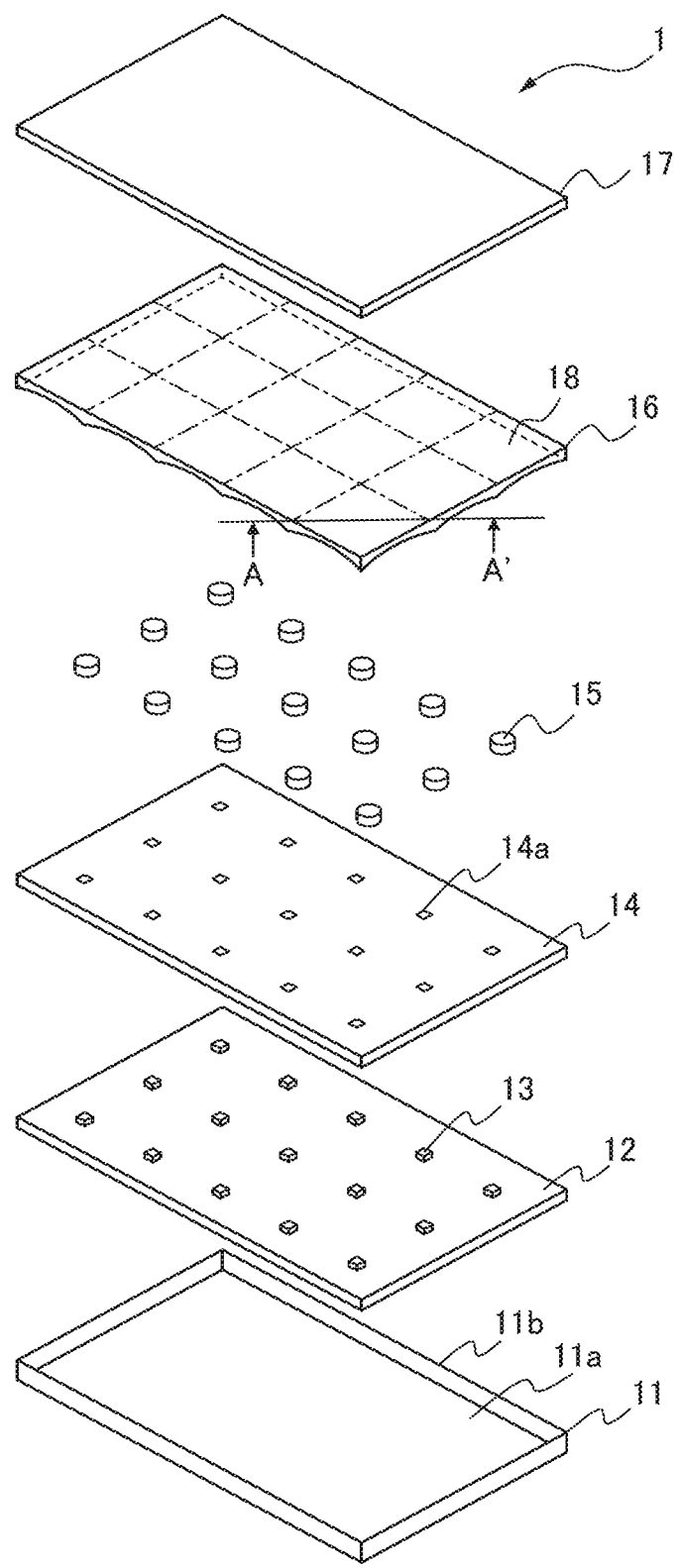
FIG. 1 is an exploded perspective diagram of a light-emitting device 1 according to a first embodiment.

FIG. 1 is an exploded perspective diagram of a light-emitting device 1 according to a first embodiment.

The light-emitting device 1 has a chassis 11, a circuit substrate 12, a plurality of LEDs 13, a reflection plate 14, a plurality of wide-angle lenses 15, a lens sheet 16, and an optical sheet 17. The circuit substrate 12 is housed in the chassis 11 and each of the plurality of LEDs 13 is mounted on the upper surface of the circuit substrate 12 and radiates Lambertian light in accordance with an input current from the upper surface and the side surface. In the reflection plate 14, a through-hole 14a is formed in the portion corresponding to each of the plurality of LEDs 13. Each of the plurality of wide-angle lenses 15 is bonded to the reflection plate 14 so as to cover each of the plurality of LEDs 13. On the lens sheet 16, a plurality of TIR Fresnel lenses 18 covering each of the plurality of wide-angle lenses 15 is arrayed. The optical sheet 17 is arranged on the upper portion of the lens sheet 16.

The chassis 11 is formed by an aluminum plate whose thickness is 0.6 mm and includes a rectangular bottom surface 11a. Further, the chassis 11 has a side wall 11b whose height is 5.8 mm on each side of the bottom surface 11a. The circuit substrate 12 is a glass epoxy substrate whose thickness is 1.0 mm and on the upper surface of the circuit substrate 12, a circuit is formed by a metal wiring. On the upper surface of the circuit substrate 12, the LEDs 13 are arrayed in three rows and in five columns. Here, the LEDs 13 are arrayed in three rows and in five columns, but the number of rows and the number of columns of the LEDs arrayed in the light-emitting device according to the embodiment are not limited to those. The reflection plate 14 is formed by white PET (polyethylene terephthalate) and whose thickness is 0.2 mm.

The LED 13 is a package product whose planar size is 1.5 mm×1.5 mm and whose height is 0.25 mm and includes a connection electrode on the bottom surface and radiates light from the upper surface and the side surface. Each of the plurality of wide-angle lenses 15 is formed by polycarbonate and whose diameter is about 5.3 mm and whose height is about 2.6 mm. The plurality of wide-angle lenses 15 is arranged so as to cover the one LED 13 and arrayed in three rows and in five columns as a whole like the LEDs 13. Lighting of each LED 13 may be controlled individually in order to implement local dimming by a control device, not shown schematically. The wide-angle lens 15 has a hollow in the form of a cone on the upper surface, as will be described later. The lens sheet 16 is formed by polycarbonate and whose thickness is about 4.0 mm. Each TIR Fresnel lens 18 included in the lens sheet 16 is arranged so as to cover the one LED 13 and the one wide-angle lens 15 and the TIR Fresnel lenses 18 are arrayed in three rows and in five columns on the lens sheet 16. The optical sheet 17 is a diffusion sheet that uses PET as a base material and whose thickness is about 0.13 mm.

Hereinafter, a set of the one LED 13, the wide-angle lens 15 covering the LED 13, and the TIR Fresnel lens 18 covering the wide-angle lens 15 is called an optical unit 10 (in FIG. 1, no symbol is shown schematically).

(Optical Unit According to First Embodiment)

Figure 2:
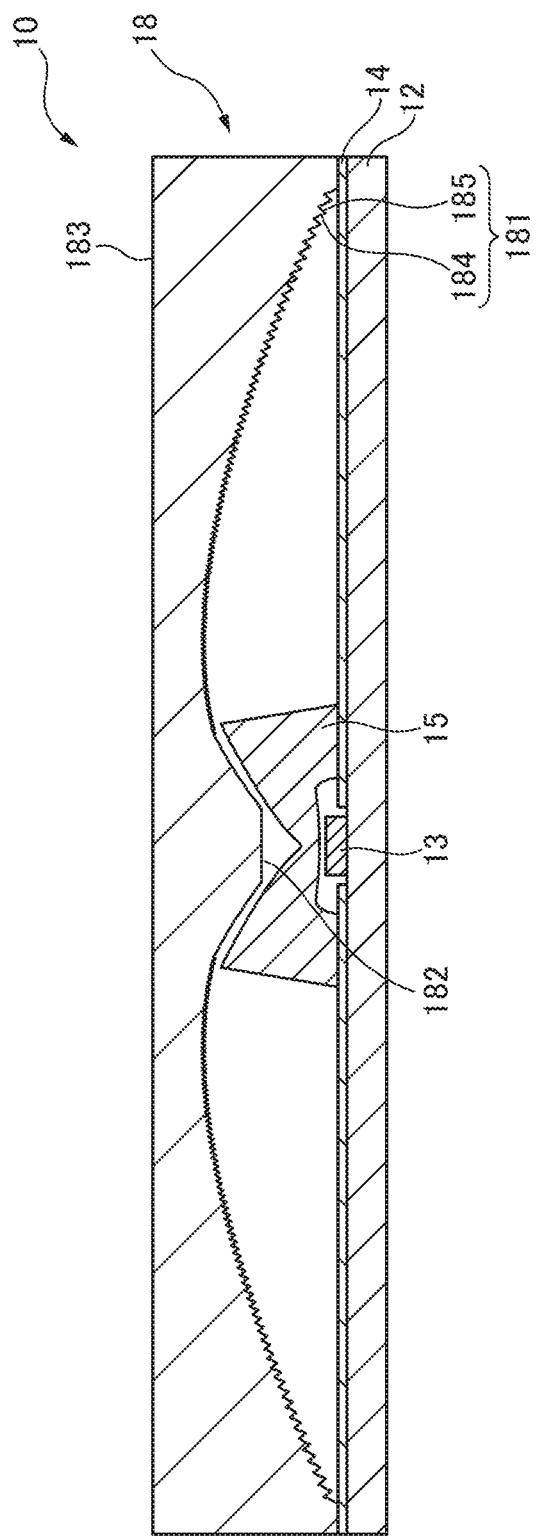
FIG. 2 is a sectional diagram of the one optical unit drawn along an AA' line in FIG. 1.

FIG. 2 is a sectional diagram of the one optical unit 10 drawn along an AA' line in FIG. 1. As described previously, the optical unit 10 has the one LED 13, the wide-angle lens 15 covering the LED 13, and the TIR Fresnel lens 18 covering the wide-angle lens 15. In FIG. 2, part of the circuit substrate 12 and the reflection plate 14 corresponding to the optical unit 10 is also described.

Figure 3:
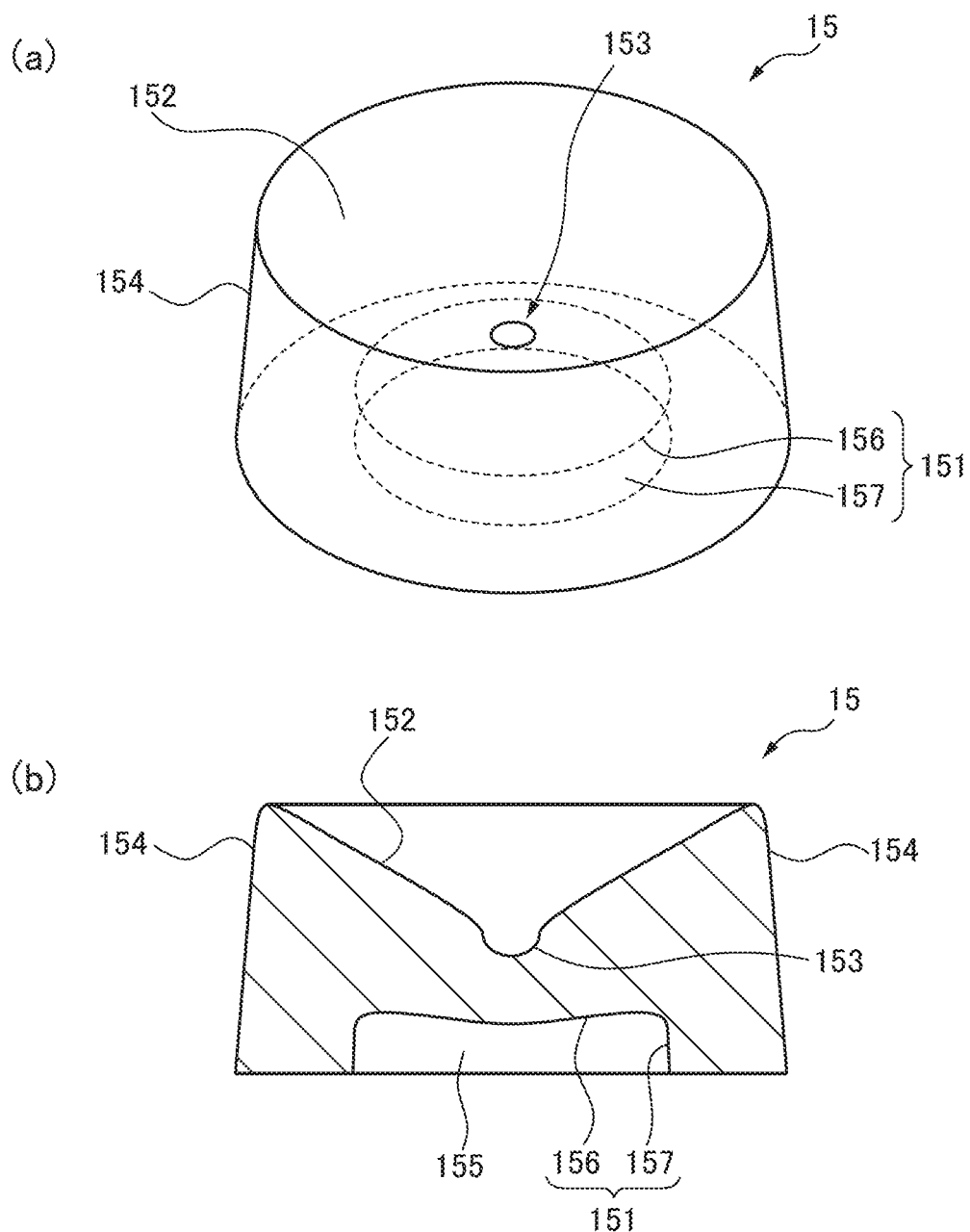
FIG. 3A is a perspective diagram of the wide-angle lens illustrated in FIG. 1.
FIG. 3B is a sectional diagram of the wide-angle lens illustrated in FIG. 1.

Before giving detailed explanation of FIG. 2, the wide-angle lens 15 is explained by FIG. 3A and FIG. 3B. FIG. 3A is a perspective diagram of the wide-angle lens 15 and FIG. 3B is a sectional diagram of the wide-angle lens 15. In FIG. 3A, a line seen through is indicated by a broken line.

The wide-angle lens 15 has a first incidence surface 151, a first reflection surface 152, a first bottom portion 153, and a first light exit surface 154. The wide-angle lens 15 has a shape in which the first reflection surface 152 and the first bottom portion 153 are formed in the upper portion of a truncated cone and an LED light source housing unit 155 is formed in the lower portion of the truncated cone. The wide-angle lens 15 is rotationally symmetric and arranged so that the optical axis coincides with the optical axis of the TIR Fresnel lens 18.

The first incidence surface 151 is the wall surface of the LED light source housing unit 155 for housing the LED 13 and has an upper-portion incidence surface 156 and a side-portion incidence surface 157 and light radiated from the LED 13 enters the first incidence surface 151. The LED light source housing unit 155 is a hollow in the shape of an approximate cylinder opened in the upward direction. The upper-portion incidence surface 156 is a curved surface having a shape that becomes convex in the downward direction and is in opposition to the upper surface of the LED 13. The side-portion incidence surface 157 has a tapered shape that comes closer to the optical axis in the upward direction, i.e., a side surface in the shape of a cylinder whose diameter becomes smaller in the upward direction. The curved surface of the side-portion incidence surface 157 is a more gradually tapered shape than a tapered shape provided for cutting out a pattern, i.e., a shape whose rise angle is small when measured from the horizontal plane.

The first reflection surface 152 has the shape of an inverted cone and forms a gradually curved surface convex upward as a whole, and is an inclined surface extending from the first bottom portion 153 toward the upper side of the first light exit surface 154 and is a total reflection surface totally reflecting light laterally that enters via the first incidence surface 151 from the LED 13 (to be more exact, emitting from the point at which the upper surface of the LED 13 and the optical axis intersect). Thus, the first reflection surface 152 has a concave shape and is arranged above the first incidence surface 151 and totally reflects light laterally that enters via the first incidence surface 151 form the LED 13.

The first bottom portion 153 is hemispherical and arranged at a position in opposition to the LED 13 via the first incidence surface 151. The first bottom portion 153 reflects part of light that enters from the LED 13 (see FIG. 2) via the first incidence surface 151 and transmits part of the light that enters from the LED 13 via the first incidence surface 151.

The first light exit surface 154 is the side surface of the wide-angle lens 15 arranged along the entire circumference of the first reflection surface, and has a tapered shape that forms a curved surface that comes closer to the optical axis in the upward direction and causes light that reflects from the first reflection surface 152 to exit to the outside of the wide-angle lens 15.

Returning to FIG. 2 and the other members are explained. The TIR Fresnel lens 18 has an incidence/reflection surface 181, a central incidence surface 182, and a second light exit surface 183. The incidence/reflection surface 181 is located on the lower surface of the TIR Fresnel lens 18 and has a plurality of minute prisms arrayed concentrically. The minute prisms possessed by the incidence/reflection surface 181 are arrayed so as to form a curved surface convex in the upward direction toward the outside from the optical axis. Further, the minute prisms possessed by the incidence/ reflection surface 181 are formed so that the size of the section becomes larger toward the outside from the optical axis. The shape of the TIR Fresnel lens 18 is approximately rectangular when viewed in a plane (see FIG. 1), and therefore part of the annular ring of the minute prism on the outside of the incidence/reflection surface is lost.

The minute prism possessed by the incidence/reflection surface 181 is formed so that the inside surface serves as an incidence surface and the outside surface serves as a total reflection surface totally reflecting light upward that enters the incidence surface. Thus, the inside surface of each of the plurality of minute prisms possessed by the incidence/ reflection surface 181, i.e., the surface on the optical axis side is a second incidence surface 184 and the outside surface of each of the plurality of minute prisms possessed by the incidence/reflection surface 181, i.e., the surface on the opposite side of the optical axis side is a second reflection surface 185. Each of the plurality of second incidence surfaces 184 is arranged concentrically and light that exits from the first light exit surface 154 of the wide-angle lens 15 enters each of the plurality of second incidence surfaces 184. Each of the plurality of second reflection surfaces 185 is arranged alternately with the plurality of second incidence surfaces 184 and totally reflects light upward that enters each of the plurality of second incidence surfaces 184.

The central incidence surface 182 is a plane extending in the horizontal direction in the area on the inside of the incidence/reflection surface 181 and light that transmit at least one of the first reflection surface 152 and the first bottom portion 153 of the wide-angle lens 15 enters the central incidence surface 182. Thus, the central incidence surface 182 has a circular shape and is surrounded by the incidence/reflection surface 181, and the center of the central incidence surface 182 is located on the optical axis. Light that enters the central incidence surface 182 is caused to exit in various directions in accordance with the refractive index of the TIR Fresnel lens 18 and the incidence angle when the light enters the central incidence surface 182.

The second light exit surface 183 is the upper surface of the TIR Fresnel lens 18 and has a rectangular, planar shape, and is arranged above the incidence/reflection surface 181, and causes light to exit upward that reflects from the plurality of second reflection surfaces 185.

Figure 4:
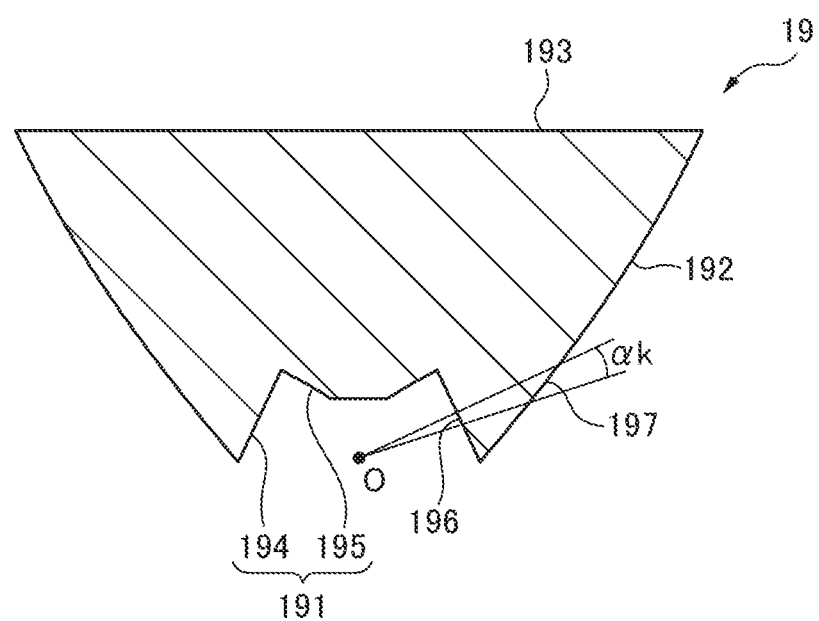
FIG. 4 is a sectional diagram of a TIR lens corresponding to the TIR Fresnel lens illustrated in FIG.

FIG. 4 is a sectional diagram of a TIR lens 19 corresponding to the TIR Fresnel lens 18. The TIR Fresnel lens 18 is a lens obtained by turning the TIR lens 19 into a Fresnel lens. The TIR lens 19 is explained with reference to the symbol of the TIR Fresnel lens 18.

The TIR lens 19 is rotationally symmetric and has an incidence surface 191, a reflection surface 192, and a light exit surface 193. The incidence surface 191 is a surface corresponding to the central incidence surface 182 and the second incidence surface 184 and has a side-wall incidence surface 194 and an upper-wall incidence surface 195, and forms the lower surface of the TIR lens 19. The side-wall incidence surface 194 corresponds to the second incidence surface 184 and the upper-wall incidence surface 195 corresponds to the central incidence surface 182. The reflection surface 192 is a surface corresponding to the second reflection surface 185 and forms the side surface of the TIR lens 19. The light exit surface 193 is a surface corresponding to the second light exit surface 183 and forms the upper surface of the TIR lens 19. The side-wall incidence surface 194 and the reflection surface 192 form a minute prism possessed by the incidence/reflection surface 181 when turned into Fresnel surfaces.

The processing to form the TIR Fresnel lens 18 by turning the TIR lens 19 into a Fresnel lens is performed approximately by steps as follows. First, the number of minute prisms possessed by the incidence/reflection surface 181 is determined. When the number is n, an angle αi (i=1 to n, in FIG. 4, indicating kth angle αk) is determined so as to divide the reflection surface 192 into n surfaces. A small piece 196 included in the side-wall incidence surface 194 is moved while keeping the similar figure in the range indicated by the angle αK for the kth minute prism. For simplification of explanation, refraction at the time of incidence is ignored, and therefore under this condition, the optical action of the small piece 196 does not change for the light ray emitted from an origin O. Similarly, a small piece 197 included in the reflection surface 192 is also moved while keeping the similar figure in the range indicated by the angle αk. At this time also, the optical action of the small piece 197 does not change. By moving the first to nth minute prisms formed by the small pieces 196 and 197 to desired positions by making use of these geometrical properties in turning of a surface into a Fresnel surface, the incidence/reflection surface 181 having minute prisms is completed. At this time, the planar size of the TIR Fresnel lens 18 may be arbitrarily set.

Figure 5:
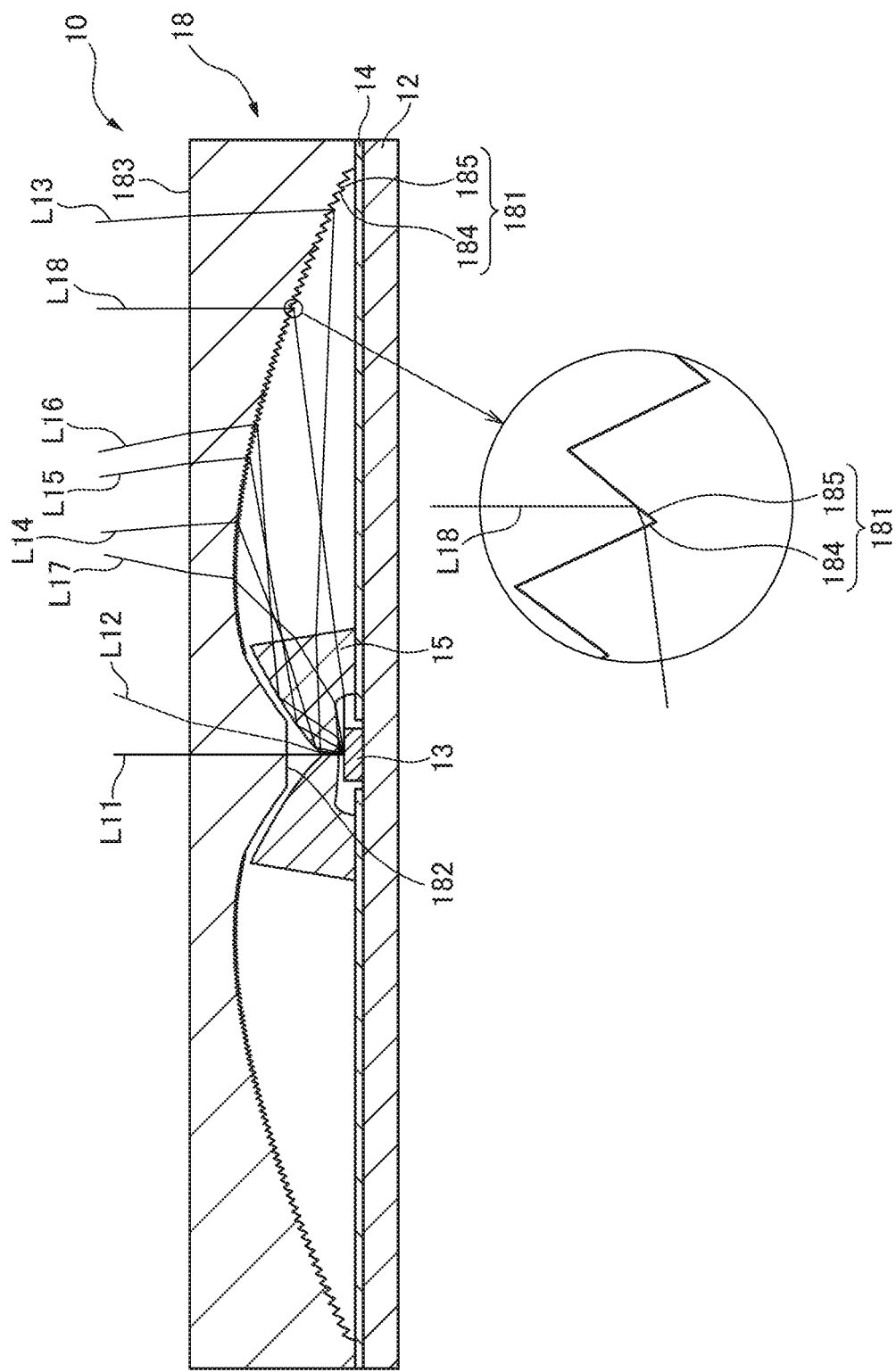
FIG. 5 is a diagram showing light paths of light radiated from the LED in the optical unit illustrated in FIG. 2.

FIG. 5 is a diagram showing light paths of light radiated from the LED 13 in the optical unit 10.

Light L11 and L12 exit upward from the LED 13 and after entering the wide-angle lens 15 from the upper-portion incidence surface 156, exit upward from the first bottom portion 153. The light L11 and L12 enter the TIR Fresnel lens 18 from the central incidence surface 182 and exit upward from the second light exit surface 183. Light L13 to L16 exit upward from the LED 13 and after entering the wide-angle lens 15 from the upper-portion incidence surface 156, reflect from the first reflection surface 152 and exit obliquely laterally from the first light exit surface 154. The light L13 to L16 enter the TIR Fresnel lens 18 from the second incidence surface 184 at the incidence/reflection surface 181 and reflect from the second reflection surface 185 adjacent to the outside of the second incidence surface 184 from which the light L13 to L16 have entered and exit upward from the second light exit surface 183.

Light L17 exits from the LED 13 and after entering the wide-angle lens 15 from the upper-portion incidence surface 156, exits laterally from the first light exit surface 154 without interposition of the first reflection surface 152. The light L17 enters the TIR Fresnel lens 18 from the second incidence surface 184 on the inside at the incidence/reflection surface 181, reflects from the second reflection surface 185 on the outside of the second incidence surface 184, and exits upward from the second light exit surface 183. Light L18 traveling laterally exits laterally from the LED 13 and after entering the wide-angle lens 15 from the side-portion incidence surface 157, exits laterally from the first light exit surface 154. The light L18 enters the TIR Fresnel lens 18 from the second incidence surface 184 on the outside at the incidence/reflection surface 181, reflects from the second reflection surface 185 adjacent to the outside of the second incidence surface 184 from which the light L18 has entered, and exits upward from the second light exit surface 183.

In each of the optical units 10 included in the light-emitting device 1, the wide-angle lens 15 converts Lambertian light radiated from the LED 13 into light having many components in the horizontal direction. By the Lambertian light radiated from the LED 13 being converted by the wide-angle lens 15 so as to spread in the horizontal direction and widely exiting in the horizontal direction, the arrangement pitch of the LED 13 may be increased, and therefore the number of LEDs 13 arranged in the light-emitting device 1 may be reduced. Further, the TIR Fresnel lens 18 controls directivity characteristics of light that exits from the wide-angle lens, and therefore the wide-angle lens 15 is downsized since it is no longer necessary for the wide-angle lens 15 to control directivity characteristics. Further, by the light-emitting device 1 using the TIR Fresnel lens 18 whose thickness is reduced by being turned into a Fresnel lens at the time of controlling directivity, compared to the case where directivity is controlled only by a wide-angle lens (in the case where directivity is controlled by combining a wide-angle lens, a diffusion plate, and a prism sheet), the thickness may be significantly reduced. As described above, by the light-emitting device 1 controlling light radiated from the LED 13 by using the wide-angle lens 15 and the TIR Fresnel lens 18, the thickness and the number of LEDs 13 may be about the same level as those of a side edge type light-emitting device designed for a medium/small-sized liquid crystal display device.

Figure 25:
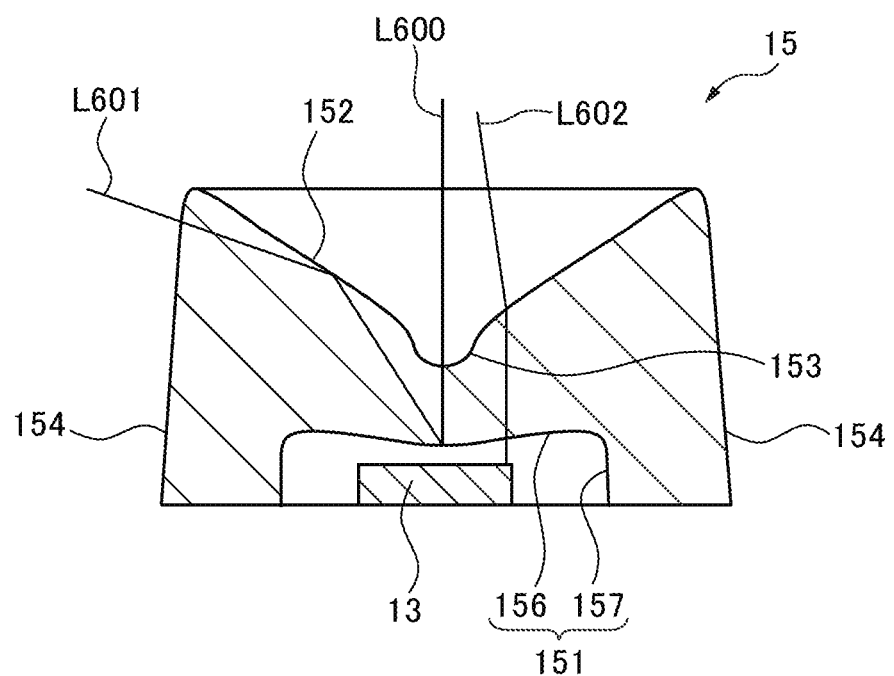
FIG. 25 is a diagram showing light paths of light radiated from the LED in the wide-angle lens mounted on the light-emitting devices illustrated in FIG. 23A.

The first reflection surface 152 of the wide-angle lens 15 is set so that light emitted from the point at which the upper surface (light-emitting surface) of the LED 13 and the optical axis intersect reflects totally (see FIG. 5, FIG. 25). However, the upper surface of the LED 13 spreads in the form of a plane, and therefore light radiated from the LED 13 is divided into the component that reflects in the horizontal direction from the first reflection surface 152 and the component that transmits the first reflection surface 152 and travels in the vertical direction. Thus, the amount of light that exits in the vertical direction from the LED 13 through the wide-angle lens 15 and the TIR Fresnel lens 18 is reduced, and therefore the size of the hot spot visually recognized directly over the LED 13 and the amount of light are reduced.

(Light-Emitting Device According to Second Embodiment)

Figure 6:
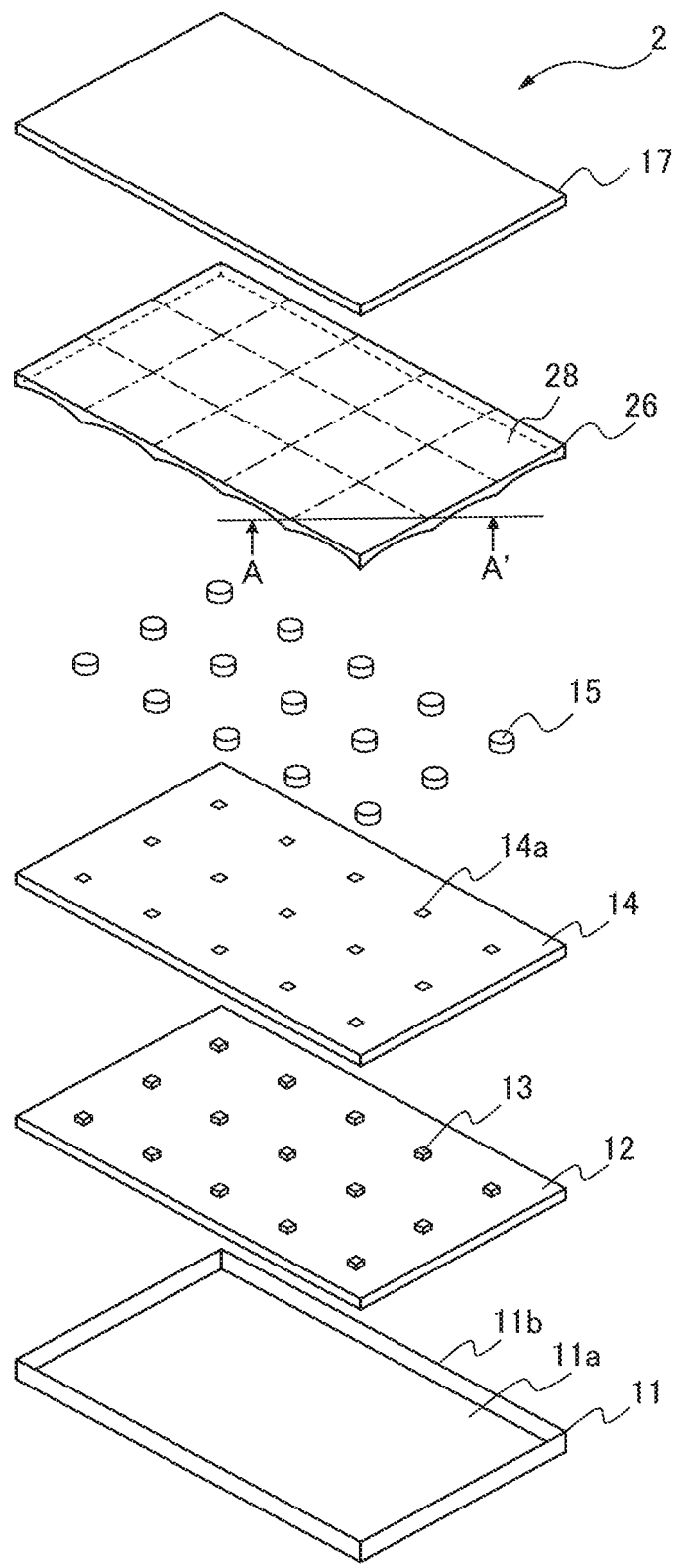
FIG. 6 is an exploded perspective diagram of a light-emitting device according to a second embodiment.

FIG. 6 is an exploded perspective diagram of a light-emitting device 2 according to a second embodiment.

The light-emitting device 2 differs from the light-emitting device 1 in having a lens sheet 26 in place of the lens sheet 16. The configurations and functions of the components of the light-emitting device 2 except for the lens sheet 26 are the same as the configurations and functions of the components of the light-emitting device 1, to which the same symbols are attached, and therefore detailed explanation is omitted here. The lens sheet 26 differs from the lens sheet 16 in having a TIR Fresnel lens 28 in place of the TIR Fresnel lens 18. Similar to the TIR Fresnel lens 18, each TIR Fresnel lens 28 is arranged so as to cover the one LED 13 and the one wide-angle lens 15 and the TIR Fresnel lenses 28 are arrayed in three rows and in five columns in the lens sheet 26.

(Optical Unit According to Second Embodiment)

Figure 7:
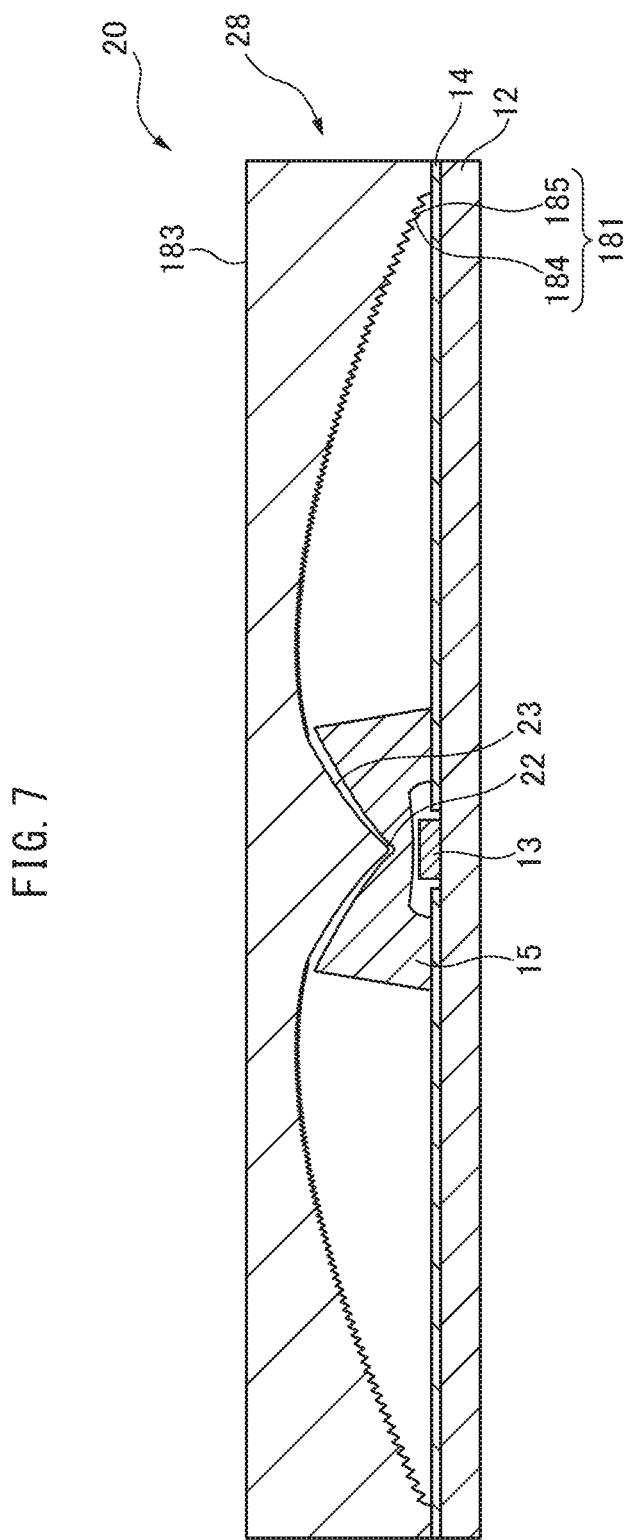
FIG. 7 is a sectional diagram of one optical unit drawn along an AA' line in FIG. 6.

FIG. 7 is a sectional diagram of one optical unit 20 drawn along an AA' line in FIG. 6. The optical unit 20 has the one LED 13, the wide-angle lens 15 covering the LED 13, and the TIR Fresnel lens 28 covering the wide-angle lens 15. In FIG. 7, part of the circuit substrate 12 and the reflection plate 14 corresponding to the optical unit 20 is also described.

The TIR Fresnel lens 28 differs from the TIR Fresnel lens 18 in having a second bottom portion 22 and a third incidence surface 23 in place of the central incidence surface 182. The configurations and functions of the components of the TIR Fresnel lens 28 except for the second bottom portion 22 and the third incidence surface 23 are the same as the configurations and functions of the components of the TIR Fresnel lens 18, to which the same symbols are attached, and therefore detailed explanation is omitted here.

The second bottom portion 22 is located at the lower end of the third incidence surface 23 and arranged at a position in opposition to the LED 13 via the wide-angle lens 15. The second bottom portion 22 is located on the optical axis of the TIR Fresnel lens 28 and arranged so as to coincide with the optical axis of the wide-angle lens 15.

The third incidence surface 23 is an inclined surface extending toward the inner edge of the incidence/reflection surface 181 from the second bottom portion 22 and light that transmits at least one of the first reflection surface 152 and the first bottom portion 153 of the wide-angle lens 15 enters the third incidence surface 23. Thus, the third incidence surface 23 has the shape of a cone facing downward and is surrounded by the incidence/reflection surface 181, and the second bottom portion 22 located at the vertex of the third incidence surface 23 is located on the optical axis. Light that enters the third incidence surface 23 exits in various directions in accordance with the refractive index of the TIR Fresnel lens 28 and the incidence angle when the light enters the third incidence surface 23.

In the optical unit 20, the separation distance between the third incidence surface 23 of the TIR Fresnel lens 28 and the first reflection surface 152 of the wide-angle lens 15 is comparatively large. The gap between the third incidence surface 23 and the first reflection surface 152 causes the first reflection surface 152 to function as a total reflection surface, and therefore the separation distance may be short. Thus, the third incidence surface 23 may be fitted into the first reflection surface 152 so as to leave an air layer in place of causing the third incidence surface 23 and the first reflection surface 152 to adhere close to each other. For example, the optical unit 20 may support the TIR Fresnel lens 28 by making the curvature of the third incidence surface 23 differ from the curvature of the first reflection surface 152 and causing the first bottom portion 153 and the second bottom portion 22 to come into contact with each other. By forming so that the first bottom portion 153 and the second bottom portion 22 come into contact with each other, it is made easy to assemble so that the optical axis of the TIR Fresnel lens 28 and the optical axis of the wide-angle lens 15 coincide with each other.

The processing to form the TIR Fresnel lens 28 is the same as the processing to form the TIR Fresnel lens 18 except in having the second bottom portion 22 and the third incidence surface 23, and therefore detailed explanation is omitted here.

Figure 8:
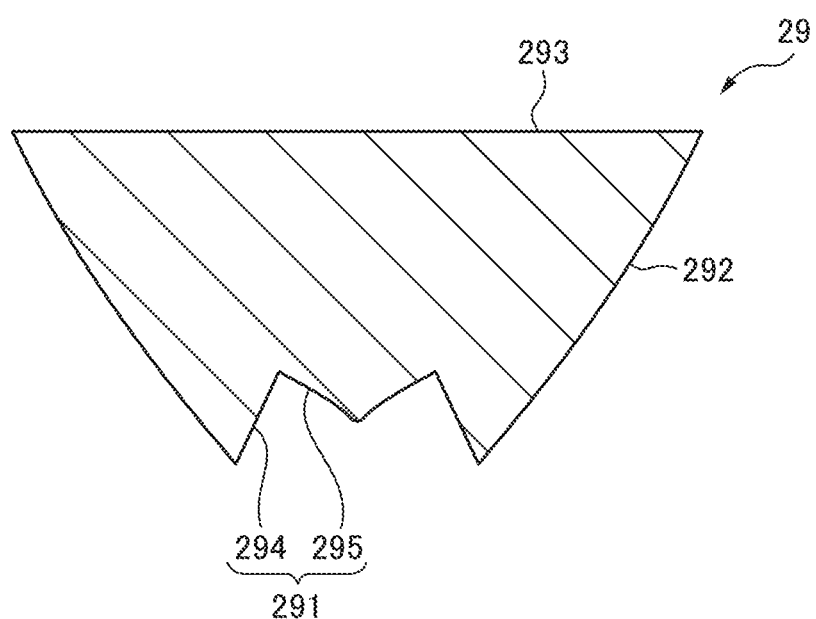
FIG. 8 is a sectional diagram of a TIR lens corresponding to the TIR Fresnel lens illustrated in FIG. 6.

FIG. 8 is a sectional diagram of a TIR lens 29 corresponding to the TIR Fresnel lens 28. The TIR Fresnel lens 28 is a lens obtained by turning the TIR lens 29 into a Fresnel lens. The TIR lens 29 is explained with reference to the symbol of the TIR Fresnel lens 28.

The TIR lens 29 is rotationally symmetric and has an incidence surface 291, a reflection surface 292, and a light exit surface 293. The incidence surface 291 is a surface corresponding to the second incidence surface 184 and the third incidence surface 23, and has a side-wall incidence surface 294 and an upper-wall incidence surface 295 and forms the lower surface of the TIR lens 29. The side-wall incidence surface 294 corresponds to the second incidence surface 184 and the upper-wall incidence surface 295 corresponds to the third incidence surface 23. The reflection surface 292 is a surface corresponding to the second reflection surface 185 and forms the side surface of the TIR lens 29. The light exit surface 293 is a surface corresponding to the second light exit surface 183 and forms the upper surface of the TIR lens 29. The side-wall incidence surface 294 and the reflection surface 292 form a minute prism possessed by the incidence/reflection surface 181 when turned into Fresnel surfaces. The upper-wall incidence surface 295 corresponds to the third incidence surface 23.

Figure 9:
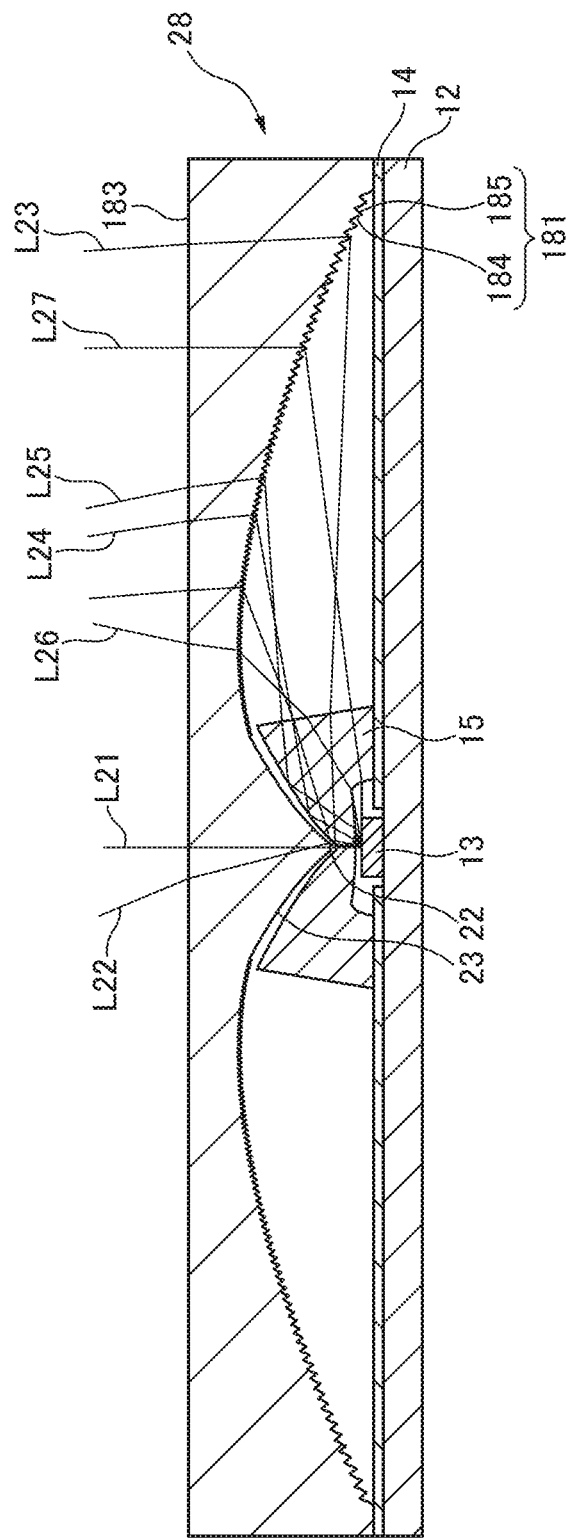
FIG. 9 is a diagram showing light paths of light radiated from the LED in the optical unit illustrated in FIG. 7.

FIG. 9 is a diagram showing light paths of light radiated from the LED 13 in the optical unit 20.

Light L21 and L22 exit upward from the LED 13 and after entering the wide-angle lens 15 from the upper-portion incidence surface 156, exit upward from the first bottom portion 153. The light L21 enters the TIR Fresnel lens 28 from the first bottom portion 153 and exits upward from the second light exit surface 183, and the light L22 enters the TIR Fresnel lens 28 from the third incidence surface 23 and exits upward from the second light exit surface 183. Light L23 to L25 exit upward from the LED 13 and after entering the wide-angle lens 15 from the upper-portion incidence surface 156, reflect from the first reflection surface 152 and exit obliquely laterally from the first light exit surface 154. The light L23 to L25 enter the TIR Fresnel lens 28 from the second incidence surface 184 at the incidence/reflection surface 181, reflect from the second reflection surface 185 adjacent to the outside of the second incidence surface 184 from which the light L23 to L25 have entered, and exit upward from the second light exit surface 183.

Light L26 exits from the LED 13 and after entering the wide-angle lens 15 from the upper-portion incidence surface 156, exits laterally from the first light exit surface 154 without interposition of the first reflection surface 152. The light L26 enters the TIR Fresnel lens 28 from the second incidence surface 184 on the inside at the incidence/reflection surface 181, reflects from the second reflection surface 185 on the outside of the second incidence surface 184, and exits upward from the second light exit surface 183. Light L27 traveling laterally exits laterally from the LED 13 and after entering the wide-angle lens 15 from the side-portion incidence surface 157, exits laterally from the first light exit surface 154. The light L27 enters the TIR Fresnel lens 28 from the second incidence surface 184 on the outside at the incidence/reflection surface 181, reflects from the second reflection surface 185 adjacent to the outside of the second incidence surface 184 from which the light L27 has entered, and exits upward from the second light exit surface 183.

In the light-emitting device 2, light that enters the third incidence surface 23 exits in various directions in accordance with the refractive index of the TIR Fresnel lens 28 and the incidence angle when the light enters the third incidence surface 23, and therefore the amount of light exiting in the vertical direction from the LED 13 is further reduced than that of the light-emitting device 1. In the light-emitting device 2, the amount of light exiting in the vertical direction from the LED 13 is further reduced than that of the light-emitting device 1, and therefore the size of the hot spot visually recognized directly over the LED 13 and the amount of light are further reduced than those of the light-emitting device 1.

Further, in the light-emitting device 2, by fitting the second incidence surface 184 having a convex shape into the first reflection surface 152 having a concave shape, the TIR Fresnel lens 28 may be arranged so that the optical axis of the wide-angle lens 15 and the optical axis of the TIR Fresnel lens 28 coincide with each other.

(Light-Emitting Device According to Third Embodiment)

Figure 10:
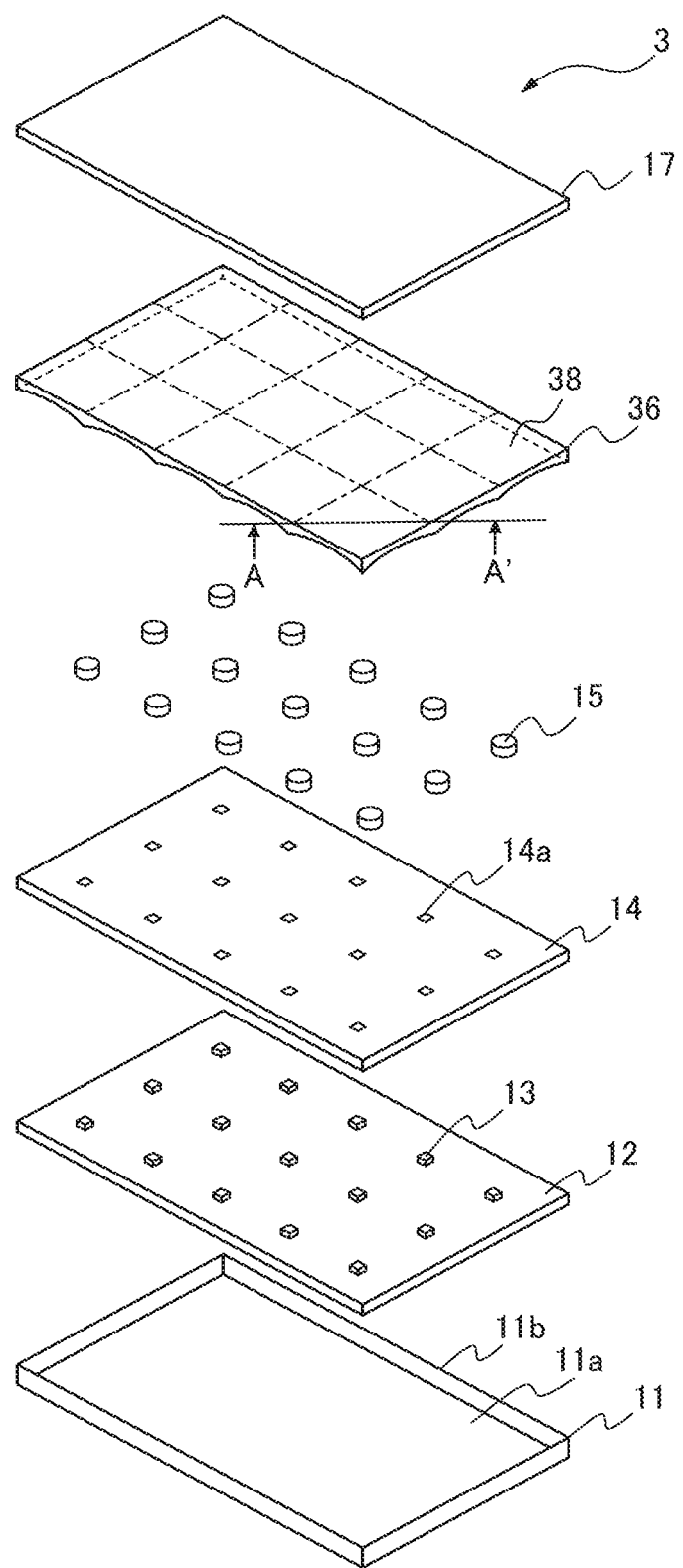
FIG. 10 is an exploded perspective diagram of a light-emitting device according to a third embodiment.

FIG. 10 is an exploded perspective diagram of a light-emitting device 3 according to a third embodiment.

The light-emitting device 3 differs from the light-emitting device 1 in having a lens sheet 36 in place of the lens sheet 16. The configurations and functions of the components of the light-emitting device 3 except for the lens sheet 36 are the same as the configurations and functions of the components of the light-emitting device 1, to which the same symbols are attached, and therefore detailed explanation is omitted here. The lens sheet 36 differs from the lens sheet 16 in having a TIR Fresnel lens 38 in place of the TIR Fresnel lens 18. Similar to the TIR Fresnel lens 18, each TIR Fresnel lens 38 is arranged so as to cover the one LED 13 and the one wide-angle lens 15 and the TIR Fresnel lenses 38 are arrayed in three rows and in five columns in the lens sheet 36.

(Optical Unit According to Third Embodiment)

Figure 11:
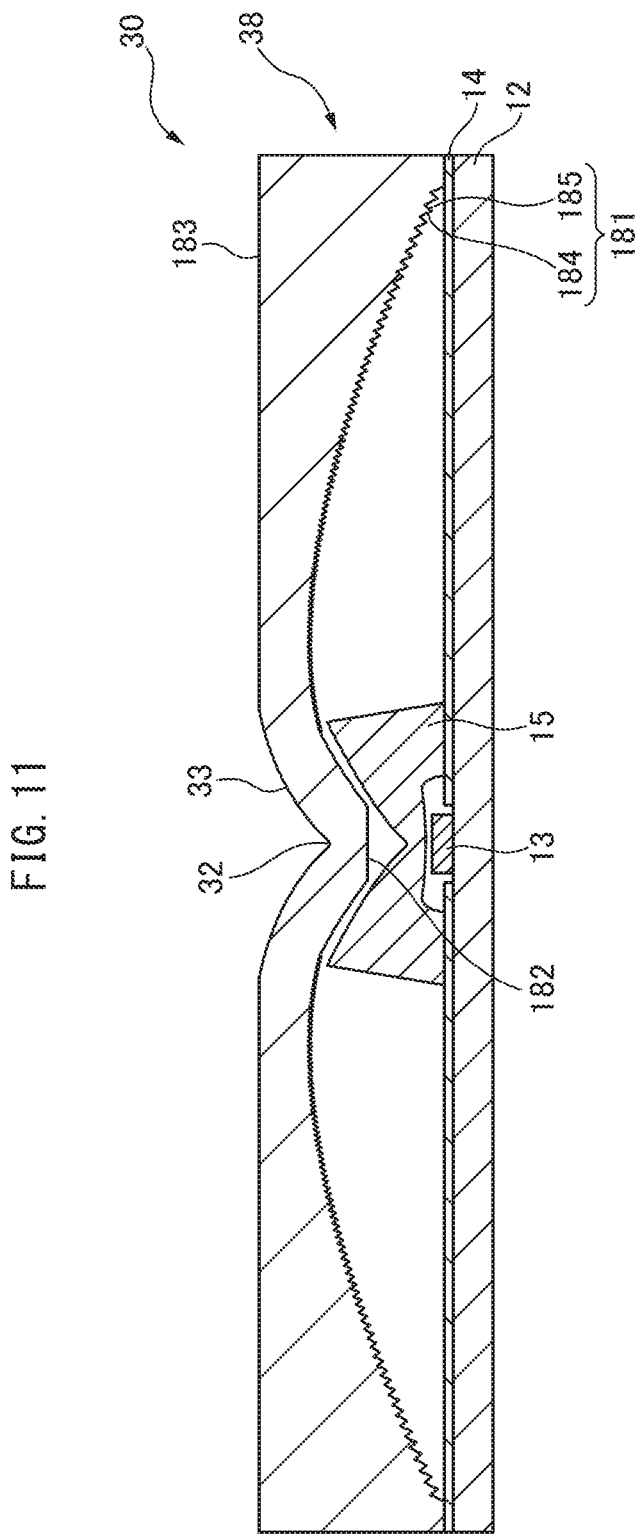
FIG. 11 is a sectional diagram of one optical unit drawn along an AA' line in FIG. 10.

FIG. 11 is a sectional diagram of one optical unit 30 drawn along an AA' line in FIG. 10. The optical unit 30 has the one LED 13, the wide-angle lens 15 covering the LED 13, and the TIR Fresnel lens 38 covering the wide-angle lens 15. In FIG. 11, part of the circuit substrate 12 and the reflection plate 14 corresponding to the optical unit 30 is also described.

The TIR Fresnel lens 38 differs from the TIR Fresnel lens 18 in having a third bottom portion 32 and a third reflection surface 33. The configurations and functions of the components of the TIR Fresnel lens 38 except for the third bottom portion 32 and the third reflection surface 33 are the same as the configurations and functions of the components of the TIR Fresnel lens 18, to which the same symbols are attached, and therefore detailed explanation is omitted here.

The third bottom portion 32 is located at the lower end of the third refection surface 33 and arranged at a position in opposition to the LED 13 via the first bottom portion 153 and the second bottom portion 22. The third bottom portion 32 is located on the optical axis of the TIR Fresnel lens 38 and arranged so as to coincide with the optical axis of the wide-angle lens 15.

The third reflection surface 33 is an inclined surface extending toward the inner edge of the second light exit surface 183 from the third bottom portion 32 and reflects light that enters from the third incidence surface 23. Thus, the third reflection surface 33 is a hollow in the shape of a cone and the third bottom portion 32 located at the center of the third reflection surface 33 is located on the optical axis.

The processing to form the TIR Fresnel lens 38 is the same as the processing to form the TIR Fresnel lens 18 except in having the third bottom portion 32 and the third reflection surface 33, and therefore detailed explanation is omitted here.

Figure 12:
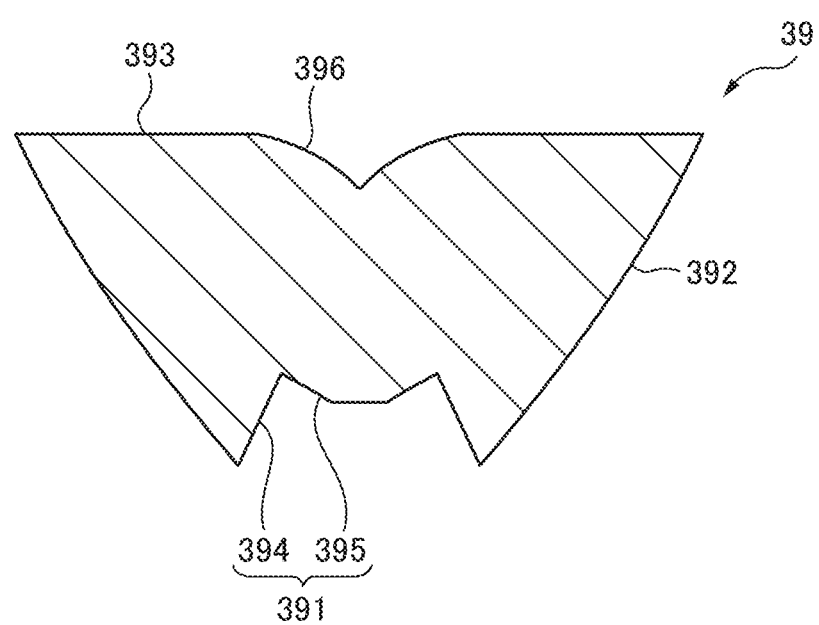
FIG. 12 is a sectional diagram of a TIR lens corresponding to the TIR Fresnel lens illustrated in FIG. 10.

FIG. 12 is a sectional diagram of a TIR lens 39 corresponding to the TIR Fresnel lens 38. The TIR Fresnel lens 38 is a lens obtained by turning the TIR lens 39 into a Fresnel lens. The TIR lens 39 is explained with reference to the symbol of the TIR Fresnel lens 38.

The TIR lens 39 is rotationally symmetric and has an incidence surface 391, a first reflection surface 392, a light exit surface 393, and a second reflection surface 396. The incidence surface 391 is a surface corresponding to the central incidence surface 182 and the second incidence surface 184 and has a side-wall incidence surface 394 and an upper-wall incidence surface 395 and forms the lower surface of the TIR lens 39. The side-wall incidence surface 394 corresponds to the second incidence surface 184 and the upper-wall incidence surface 395 corresponds to the central incidence surface 182. The first reflection surface 392 is a surface corresponding to the second reflection surface 185 and forms the side surface of the TIR lens 39. The light exit surface 393 is a surface corresponding to the second light exit surface 183 and forms the upper surface of the TIR lens 39. The side-wall incidence surface 394 and the first reflection surface 392 form the minute prism possessed by the incidence/reflection surface 181 when turned into Fresnel surfaces. The second reflection surface 396 corresponds to the third reflection surface 33.

Figure 13:
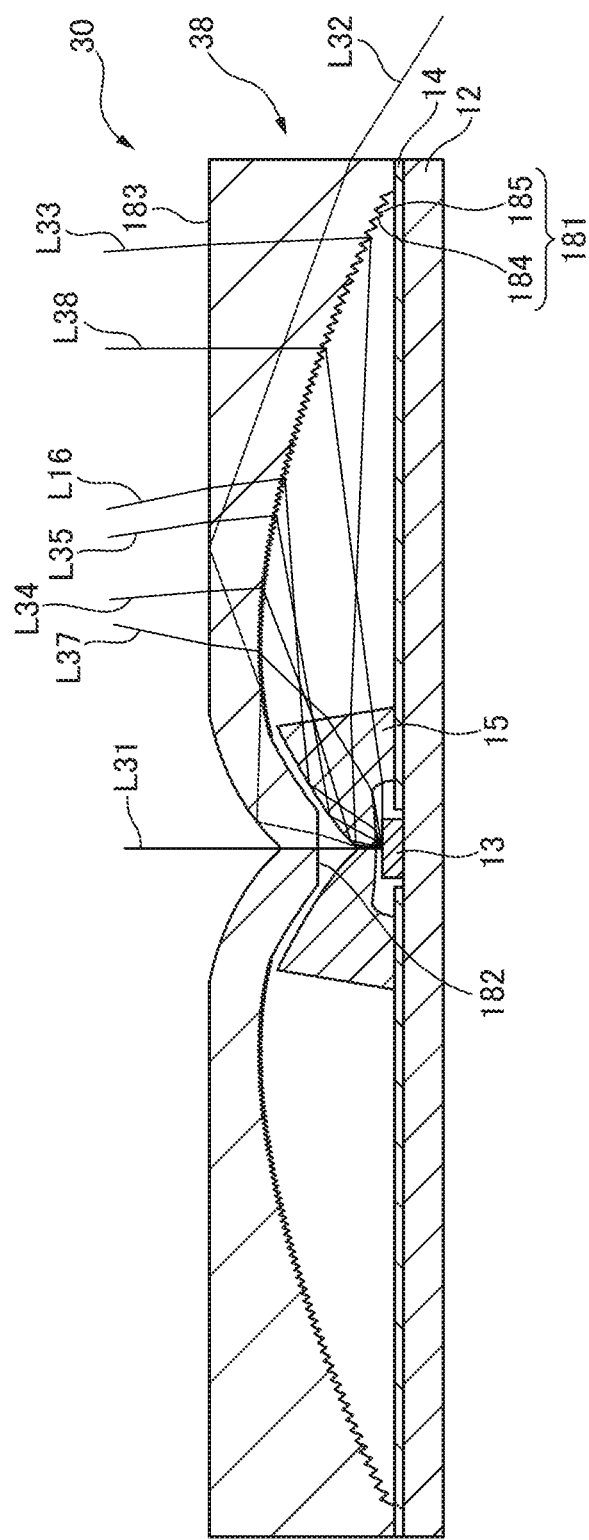
FIG. 13 is a diagram showing light paths of light radiated from the LED in the optical unit illustrated in FIG. 11.

FIG. 13 is a diagram showing light paths of light radiated from the LED 13 in the optical unit 30.

Light L31 and L32 exit upward from the LED 13 and after entering the wide-angle lens 15 from the upper-portion incidence surface 156, exit upward from the first bottom portion 153. The light L31 enters the TIR Fresnel lens 38 from the central incidence surface 182 and exits upward from the second light exit surface 183. The light L32 enters the TIR Fresnel lens 38 from the central incidence surface 182, reflects from the third reflection surface 33, and exits from the side wall of the TIR Fresnel lens 38 after passing through the inside of the TIR Fresnel lens 38 while reflecting. Light L33 to L36 exit upward from the LED 13 and after entering the wide-angle lens 15 from the upper-portion incidence surface 156, reflect from the first reflection surface 152 and exit obliquely laterally from the first light exit surface 154. The light L33 to L36 enter the TIR Fresnel lens 38 from the second incidence surface 184 at the incidence/reflection surface 181, reflect from the second reflection surface 185 adjacent to the outside of the second incidence surface 184 from which the light L33 to L36 have entered, and exit upward from the second light exit surface 183.

Light L37 exits from the LED 13, enters the wide-angle lens 15 from the upper-portion incidence surface 156, and exits laterally from the first light exit surface 154 without interposition of the first reflection surface 152. The light L37 enters the TIR Fresnel lens 38 from the second incidence surface 184 on the inside at the incidence/reflection surface 181, reflects from the second reflection surface 185 on the outside of the second incidence surface 184, and exits upward from the second light exit surface 183. Light L38 traveling laterally exits laterally from the LED 13 and after entering the wide-angle lens 15 from the side-portion incidence surface 157, exits laterally from the first light exit surface 154. The light L38 enters the TIR Fresnel lens 38 from the second incidence surface 184 on the outside at the incidence/reflection surface 181, reflects from the second reflection surface 185 adjacent to the outside of the second incidence surface 184 from which the light L38 has entered, and exits upward from the second light exit surface 183.

In the light-emitting device 3, part of light that enters the TIR Fresnel lens 38 from the central incidence surface 182 reflects from the third reflection surface 33 and exits from the side wall and the like of the TIR Fresnel lens 38, and therefore the amount of light exiting in the vertical direction from the LED 13 is further reduced than that of the light-emitting device 1. In the light-emitting device 3, the amount of light exiting in the vertical direction from the LED 13 is further reduced than that of the light-emitting device 1, and therefore the size of the hot spot visually recognized directly over the LED 13 and the amount of light are further reduced than those of the light-emitting device 1.

(Light-Emitting Device According to Fourth Embodiment)

Figure 14:
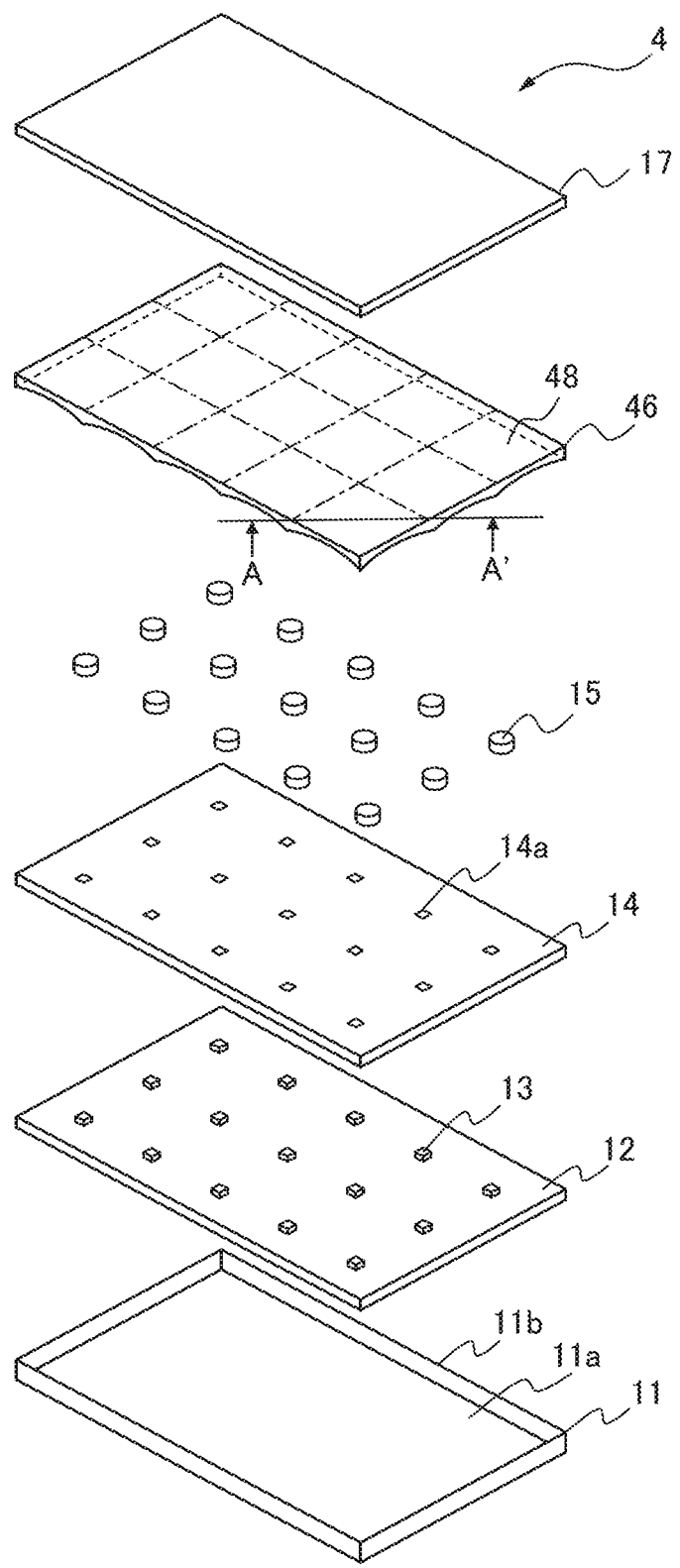
FIG. 14 is an exploded perspective diagram of a light-emitting device according to a fourth embodiment.

FIG. 14 is an exploded perspective diagram of a light-emitting device 4 according to a fourth embodiment.

The light-emitting device 4 differs from the light-emitting device 2 in having a lens sheet 46 in place of the lens sheet 26. The configurations and functions of the components of the light-emitting device 4 except for the lens sheet 46 are the same as the configurations and functions of the components of the light-emitting device 2, to which the same symbols are attached, and therefore detailed explanation is omitted here. The lens sheet 46 differs from the lens sheet 26 in having a TIR Fresnel lens 48 in place of the TIR Fresnel lens 28. Similar to the TIR Fresnel lens 28, each TIR Fresnel lens 48 is arranged so as to cover the one LED 13 and the one wide-angle lens 15 and the TIR Fresnel lenses 48 are arrayed in three rows and in five columns in the lens sheet 46.

(Optical Unit According to Fourth Embodiment)

Figure 15:
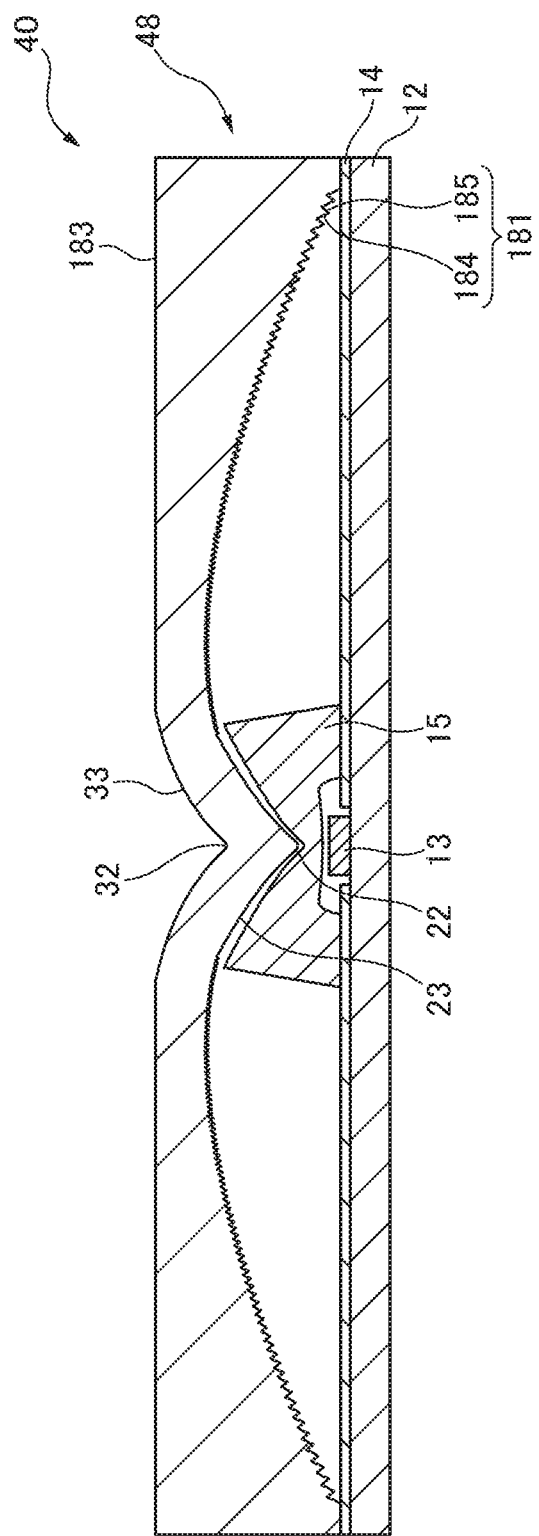
FIG. 15 is a sectional diagram of one optical unit drawn along an AA' line in FIG. 14.

FIG. 15 is a sectional diagram of one optical unit 40 drawn along an AA' line in FIG. 14. The optical unit 40 has the one LED 13, the wide-angle lens 15 covering the LED 13, and the TIR Fresnel lens 48 covering the wide-angle lens 15. In FIG. 15, part of the circuit substrate 12 and the reflection plate 14 corresponding to the optical unit 40 is also described.

The TIR Fresnel lens 48 differs from the TIR Fresnel lens 28 in having the third bottom portion 32 and the third reflection surface 33. The configurations and functions of the components of the TIR Fresnel lens 48 except for the third bottom portion 32 and the third reflection surface 33 are the same as the configurations and functions of the components of the TIR Fresnel lens 28, to which the same symbols are attached, and therefore detailed explanation is omitted here. Further, the configurations and functions of the third bottom portion 32 and the third reflection surface 33 are explained with reference to the optical unit 30, and therefore detailed explanation is omitted here.

The processing to form the TIR Fresnel lens 48 is the same as the processing to form the TIR Fresnel lens 28 except in having the third bottom portion 32 and the third reflection surface 33, and therefore detailed explanation is omitted here.

Figure 16:
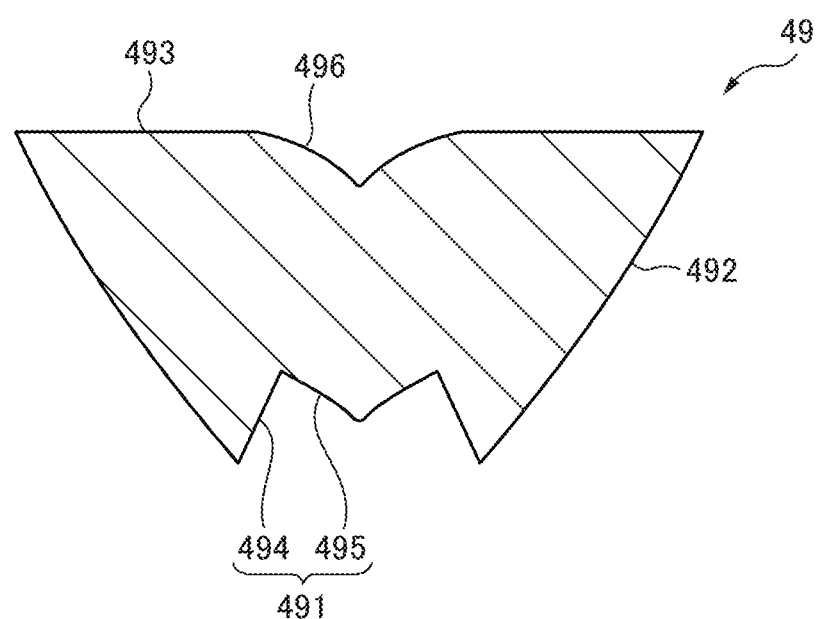
FIG. 16 is a sectional diagram of a TIR lens corresponding to the TIR Fresnel lens illustrated in FIG. 14.

FIG. 16 is a sectional diagram of a TIR lens 49 corresponding to the TIR Fresnel lens 48. The TIR Fresnel lens 48 is a lens obtained by turning the TIR lens 49 into a Fresnel lens. The TIR lens 49 is explained with reference to the symbol of the TIR Fresnel lens 48.

The TIR lens 49 is rotationally symmetric and has an incidence surface 491, a first reflection surface 492, a light exit surface 493, and a second reflection surface 496. The incidence surface 491 is a surface corresponding to the second incidence surface 184 and the third incidence surface 23 and has a side-wall incidence surface 494 and an upper-wall incidence surface 495, and forms the lower surface of the TIR lens 49. The side-wall incidence surface 494 corresponds to the second incidence surface 184 and the upper-wall incidence surface 495 corresponds to the third incidence surface 23. The first reflection surface 492 is a surface corresponding to the second reflection surface 185 and forms the side surface of the TIR lens 49. The light exit surface 493 is a surface corresponding to the second light exit surface 183 and forms the upper surface of the TIR lens 49. The side-wall incidence surface 494 and the first reflection surface 492 form the minute prism possessed by the incidence/reflection surface 181 when turned into Fresnel surfaces. The second reflection surface 496 corresponds to the third reflection surface 33.

Figure 17:
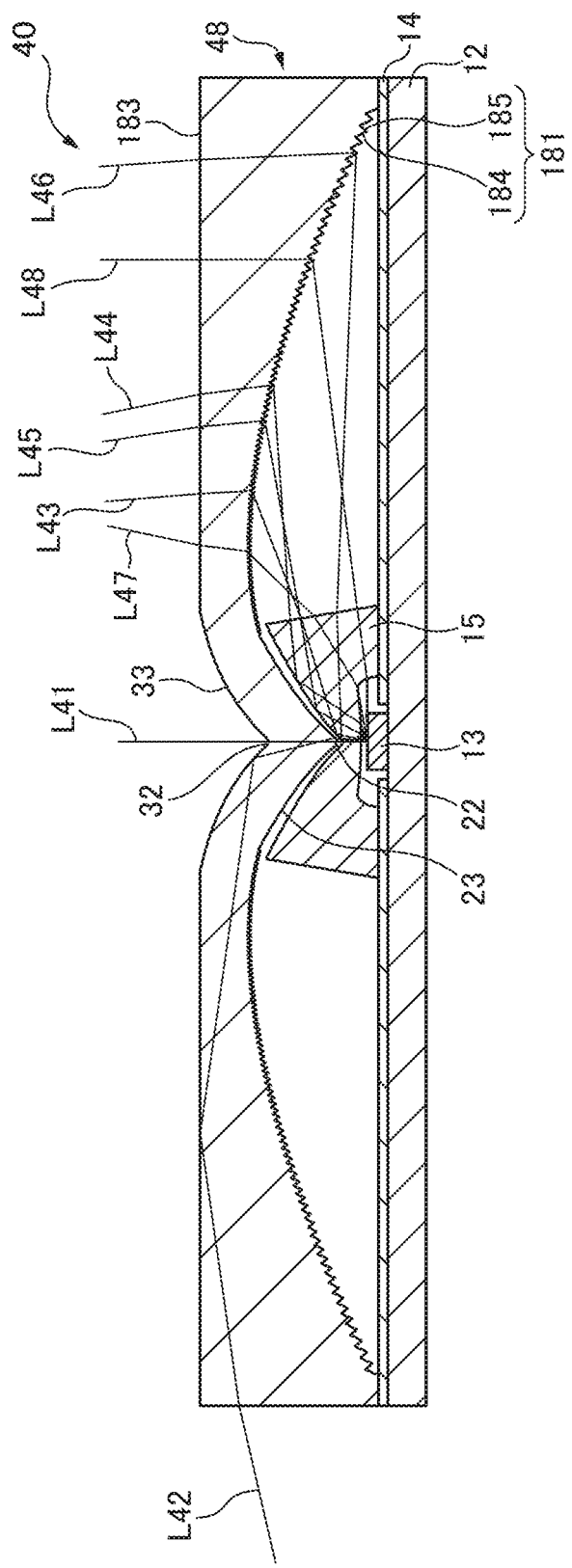
FIG. 17 is a diagram showing light paths of light radiated from the LED in the optical unit illustrated in FIG. 15.

FIG. 17 is a diagram showing light paths of light radiated from the LED 13 in the optical unit 40.

Light L41 and L42 exit upward from the LED 13 and after entering the wide-angle lens 15 from the upper-portion incidence surface 156, exit upward from the first bottom portion 153. The light L41 enters the TIR Fresnel lens 48 from the second bottom portion 22 and exits upward from the third bottom portion 32. The light L42 enters the TIR Fresnel lens 48 from the third incidence surface 23, reflects from the third reflection surface 33, and exits from the side wall of the TIR Fresnel lens 48 after passing through the inside of the TIR Fresnel lens 48 while reflecting. Light L43 to L46 exit upward from the LED 13 and after entering the wide-angle lens 15 from the upper-portion incidence surface 156, reflect from the first reflection surface 152 and exit obliquely laterally from the first light exit surface 154. The light L43 to L46 enter the TIR Fresnel lens 48 from the second incidence surface 184 at the incidence/reflection surface 181, reflect from the second reflection surface 185 adjacent to the outside of the second incidence surface 184 from which the light L43 to L46 have entered, and exit upward from the second light exit surface 183.

Light L47 exits from the LED 13 and after entering the wide-angle lens 15 from the upper-portion incidence surface 156, exits laterally from the first light exit surface 154 without interposition of the first reflection surface 152. The light 47 enters the TIR Fresnel lens 48 from the second incidence surface 184 on the inside at the incidence/reflection surface 181, reflects from the second reflection surface 185 on the outside of the second incidence surface 184, and exits upward from the second light exit surface 183. Light L48 traveling laterally exits laterally from the LED 13 and after entering the wide-angle lens 15 from the side-portion incidence surface 157, exits laterally from the first light exit surface 154. The light L48 enters the TIR Fresnel lens 48 from the second incidence surface 184 on the outside at the incidence/reflection surface 181, reflects from the second reflection surface 185 adjacent to the outside of the second incidence surface 184 from which the light L48 has entered, and exits upward from the second light exit surface 183.

In the light-emitting device 4, light that enters the third reflection surface 33 via the third bottom portion 32 reflects totally, and therefore the amount of light exiting in the vertical direction from the LED 13 is further reduced than that of the light-emitting device 2. In the light-emitting device 4, the amount of light exiting in the vertical direction from the LED 13 is further reduced than that of the light-emitting device 2, and therefore the size of the hot spot visually recognized directly over the LED 13 and the amount of light are further reduced than those of the light-emitting device 2.

(Light-Emitting Device According to Fifth Embodiment)

Figure 18:
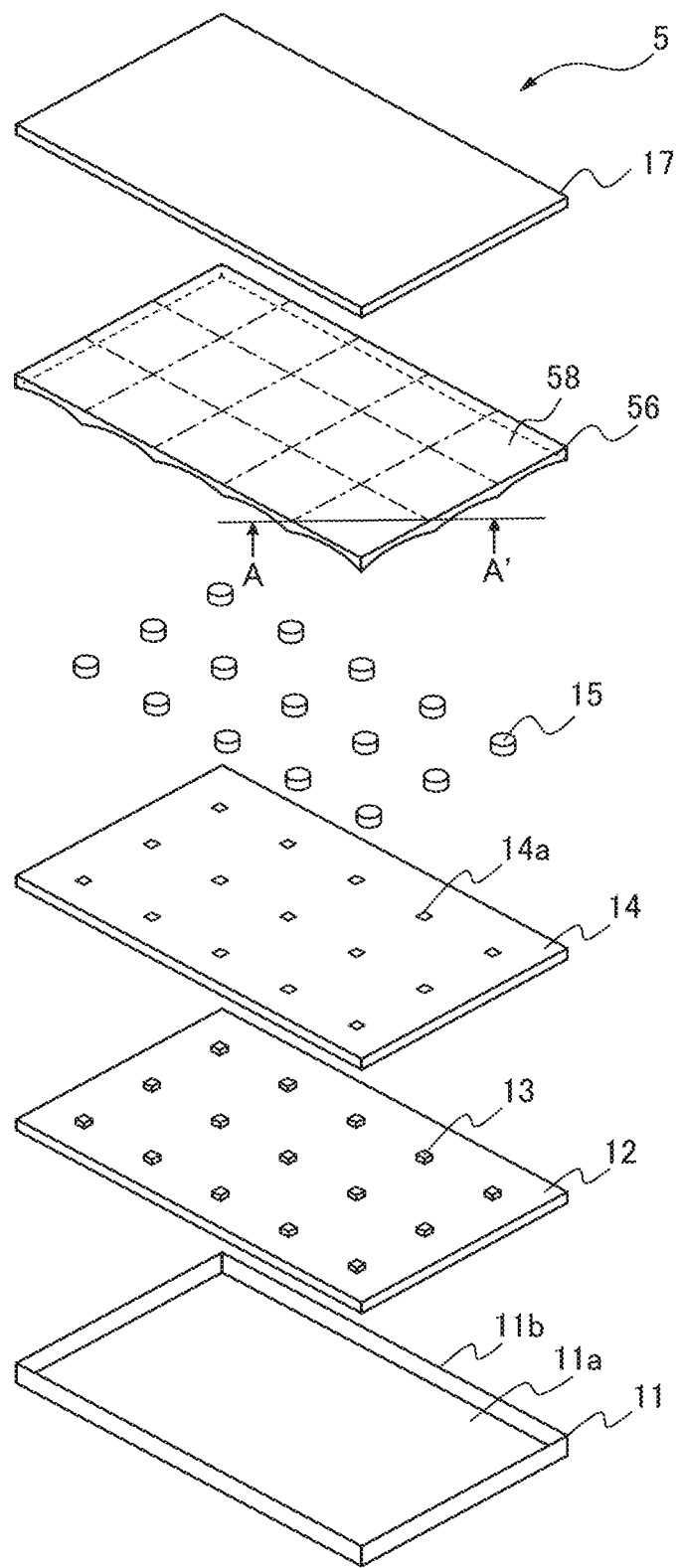
FIG. 18 is an exploded perspective diagram of a light-emitting device according to a fifth embodiment.

FIG. 18 is an exploded perspective diagram of a light-emitting device 5 according to a fifth embodiment.

The light-emitting device 5 differs from the light-emitting device 4 in having a lens sheet 56 in place of the lens sheet 46. The configurations and functions of the components of the light-emitting device 5 except for the lens sheet 56 are the same as the configurations and functions of the components of the light-emitting device 4, to which the same symbols are attached, and therefore detailed explanation is omitted here. The lens sheet 56 differs from the lens sheet 46 in having a TIR Fresnel lens 58 in place of the TIR Fresnel lens 48. Similar to the TIR Fresnel lens 48, each TIR Fresnel lens 58 is arranged so as to cover the one LED 13 and the one wide-angle lens 15 and the TIR Fresnel lenses 58 are arrayed in three rows and in five columns in the lens sheet 56.

(Optical Unit According to Fifth Embodiment)

Figure 19:
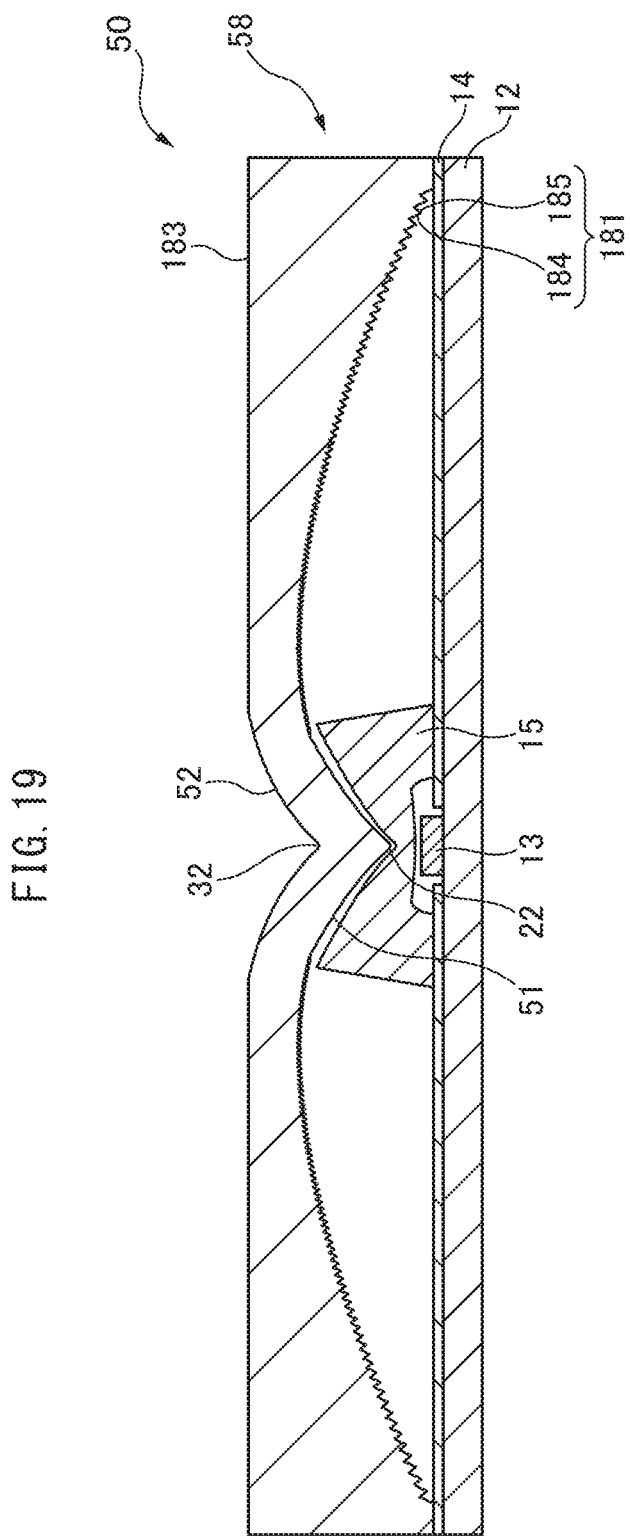
FIG. 19 is a sectional diagram of one optical unit drawn along an AA' line in FIG. 18.

FIG. 19 is a sectional diagram of one optical unit 50 drawn along an AA' line in FIG. 18. The optical unit 50 has the one LED 13, the wide-angle lens 15 covering the LED 13, and the TIR Fresnel lens 58 covering the wide-angle lens 15. In FIG. 19, part of the circuit substrate 12 and the reflection plate 14 corresponding to the optical unit 50 is also described.

The TIR Fresnel lens 58 differs from the TIR Fresnel lens 48 in having a third incidence surface 51 and a third reflection surface 52 in place of the third incidence surface 23 and the third reflection surface 33. The configurations and functions of the components of the TIR Fresnel lens 58 except for the third bottom portion 32 and the third reflection surface 33 are the same as the configurations and functions of the components of the TIR Fresnel lens 48, to which the same symbols are attached, and therefore detailed explanation is omitted here.

FIG. 20A is a plan diagram of the third incidence surface 51, FIG. 20B is an enlarged diagram of the third incidence surface 51, FIG. 20C is a plan diagram of the third reflection surface 52, and FIG. 20D is an enlarged diagram of the third reflection surface 52.

The third incidence surface 51 has a refraction surface 511 and a transmission surface 512. The refraction surface 511 is an inclined surface and causes light that enters from the LED 13 via the wide-angle lens 15 to exit in various directions in accordance with the refractive index of the TIR Fresnel lens 58 and the incidence angle when the light enters the third incidence surface 23. The transmission surface 512 is a horizontal surface and causes light that enters from the LED 13 via the wide-angle lens 15 to exit approximately in the vertical direction. The transmission surface 512 may be formed as a horizontal surface as shown in FIG. 20B or may be formed as a diffusion surface (inclined surface) subjected to surface texturing. Further, an inclined surface subjected to surface texturing may be regarded as being a surface on which minute refraction surfaces and minute transmission surfaces are dispersed, and therefore the entire third incidence surface 51 may be performed surface texturing.

The third reflection surface 52 has a reflection surface 521 and a transmission surface 522. The reflection surface 521 is an inclined surface and laterally reflects light that enters from the third incidence surface 51. The transmission surface 522 is a horizontal surface and causes light that enters from the third incidence surface 51 to exit approximately in the vertical direction. The transmission surface 522 may be formed as a horizontal surface as shown in FIG. 20D or may be formed as a diffusion surface (inclined surface) subjected to surface texturing. Further, an inclined surface subjected to surface texturing may be regarded as being a surface on which minute refraction surfaces and minute transmission surfaces are dispersed, and therefore the entire third reflection surface 52 may be performed surface texturing.

The light-emitting device 5 may prevent the luminance of the portion directly over the LED 13 from becoming too low as compared to that of the other areas since of having the transmission surfaces 512 and 522 that cause the light that enters to exit approximately in the vertical direction even if almost all parts of light radiated from the LED 13 reflect in the horizontal direction from the first reflection surface 152 or the like. Thus, the light-emitting device 5 may secure brightness of the portion directly over the LED 13 by providing the transmission surface 512 or 522 (or by performing surface texturing for the portion directly over the LED) if the portion directly over the LED 13 becomes dark since the measures against the hot spot are too strong.

In the light-emitting device 5, the transmission surfaces 512 and 522 that cause light that enters to exit approximately in the vertical direction, but the light-emitting device 5 may have a configuration in which only one of the transmission surfaces 512 and 522 is formed. For example, by causing the light-emitting device 5 to have a configuration in which the transmission surface 522 is formed on the third reflection surface 52 but the transmission surface 512 is not formed on the third incidence surface 51, the luminance directly over the LED 13 may be controlled.

(Light-Emitting Device According to Sixth Embodiment)

Figure 21:
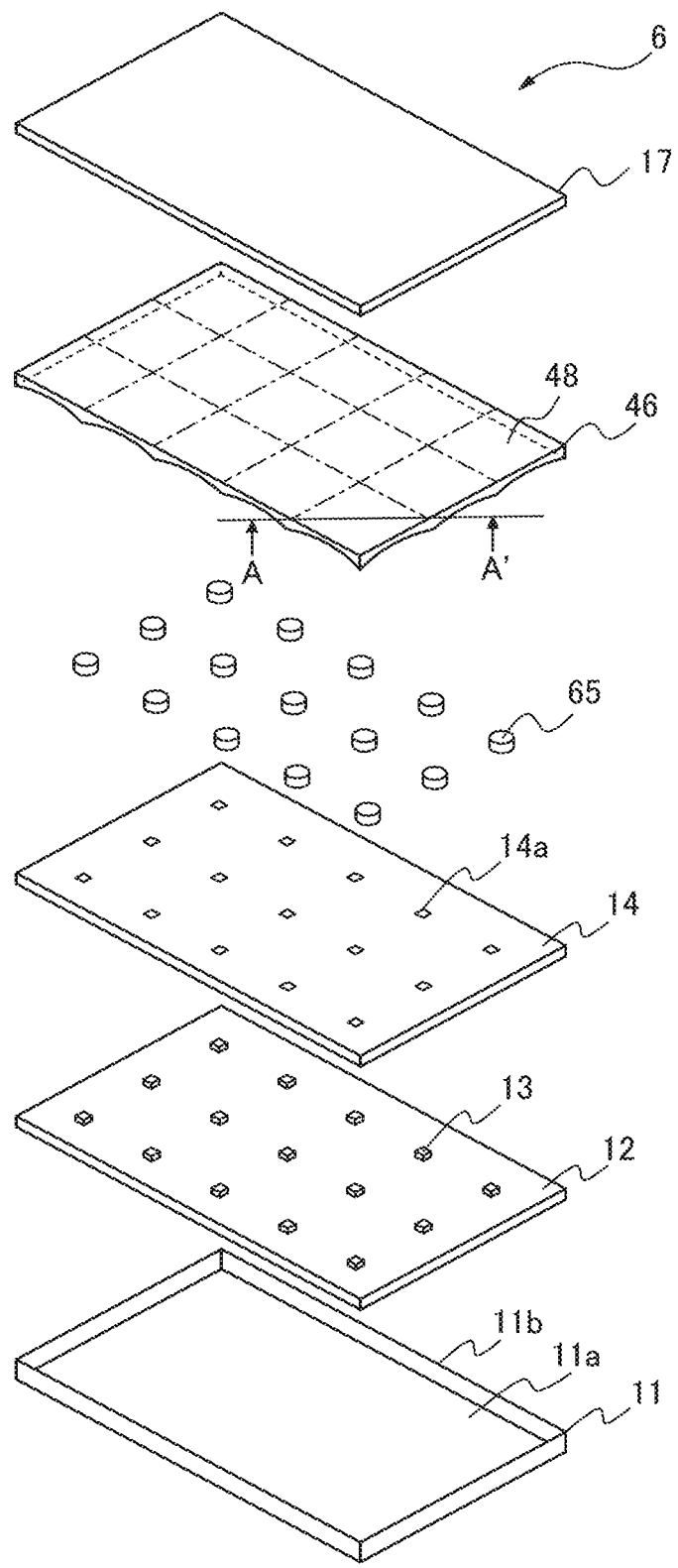
FIG. 21 is an exploded perspective diagram of a light-emitting device according to a sixth embodiment.

FIG. 21 is an exploded perspective diagram of a light-emitting device 6 according to a sixth embodiment.

The light-emitting device 6 differs from the light-emitting device 4 in having a plurality of wide-angle lenses 65 in place of a plurality of wide-angle lenses 15. The configurations and functions of the components of the light-emitting device 6 except for the plurality of wide-angle lenses 65 are the same as the configurations and functions of the components of the light-emitting device 4, to which the same symbols are attached, and therefore detailed explanation is omitted here. Each of the plurality of wide-angle lenses 65 is integrated with the LED 13 and arranged.

(Optical Unit According to Sixth Embodiment)

Figure 22:
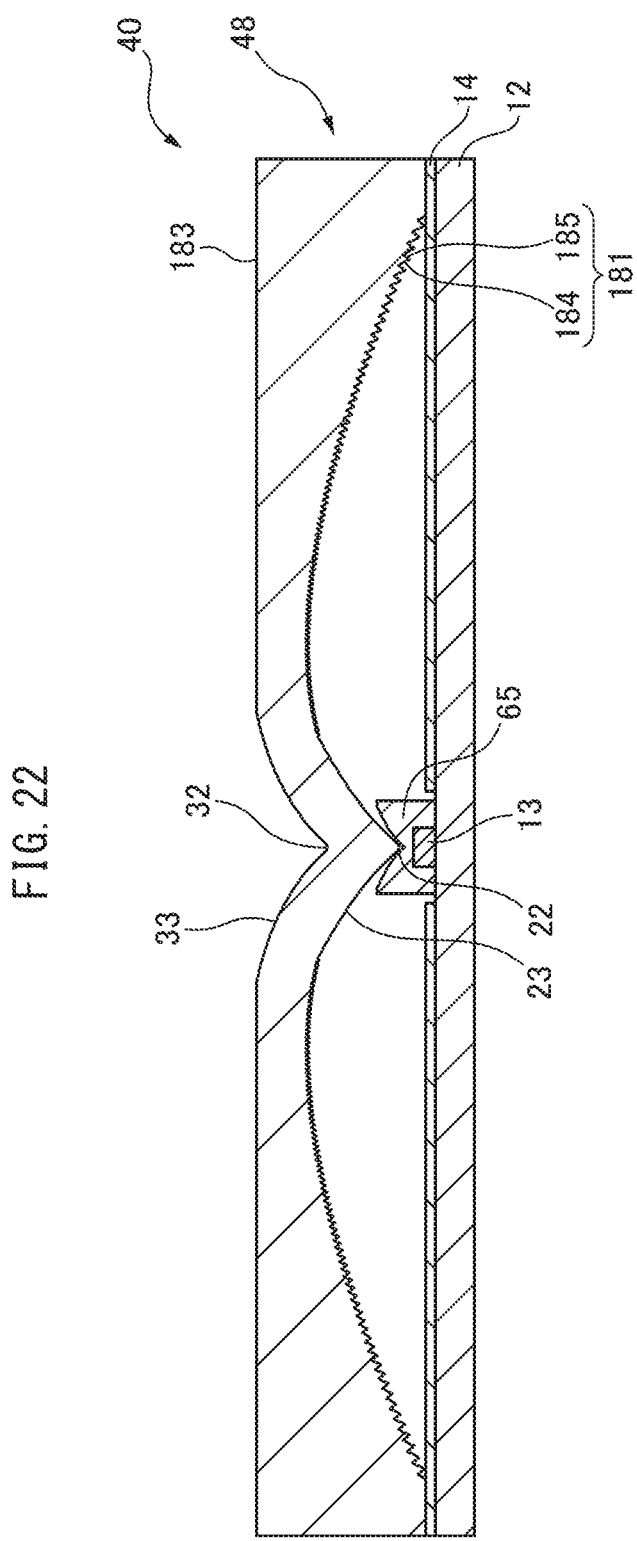
FIG. 22 is a sectional diagram of one optical unit drawn along an AA' line in FIG. 21.

FIG. 22 is a sectional diagram of one optical unit 60 drawn along an AA' line in FIG. 21. The optical unit 60 has the one LED 13, the wide-angle lens 65 covering the LED 13, and the TIR Fresnel lens 48 covering the wide-angle lens 65. In FIG. 22, part of the circuit substrate 12 and the reflection plate 14 corresponding to the optical unit 60 is also described.

FIG. 23A is a perspective diagram of the wide-angle lens 65 and FIG. 23B is a sectional diagram of the wide-angle lens 65. In FIG. 23A, a line seen through is indicated by a broken line.

The wide-angle lens 65 differs from the wide-angle lens 15 in having a first incidence surface 651 in place of the first incidence surface 151. The configurations and functions of the components of the wide-angle lens 65 except for the first incidence surface 651 are the same as the configurations and functions of the components of the wide-angle lens 15, to which the same symbols are attached, and therefore detailed explanation is omitted here.

The first incidence surface 651 is a wall surface of an LED light source housing unit 655 for integrating and housing the LED 13 and has an upper-portion incidence surface 656 and a side-portion incidence surface 657, and light radiated from the LED 13 directly enters the first incidence surface 651 without interposition of a gap. The LED light source housing unit 655 has a shape corresponding to the outer shape of the LED 13. The side-portion incidence surface 657 has a shape approximately the same as the side surface of the LED 13 and the upper-portion incidence surface 656 has a shape approximately the same as the upper surface of the LED 13. the gap between the LED 13 and the first incidence surface 651 may be filled with a transparent resin and cause the LED 13 and the wide-angle lens 65 to adhere close to each other via the resin.

Figure 24:
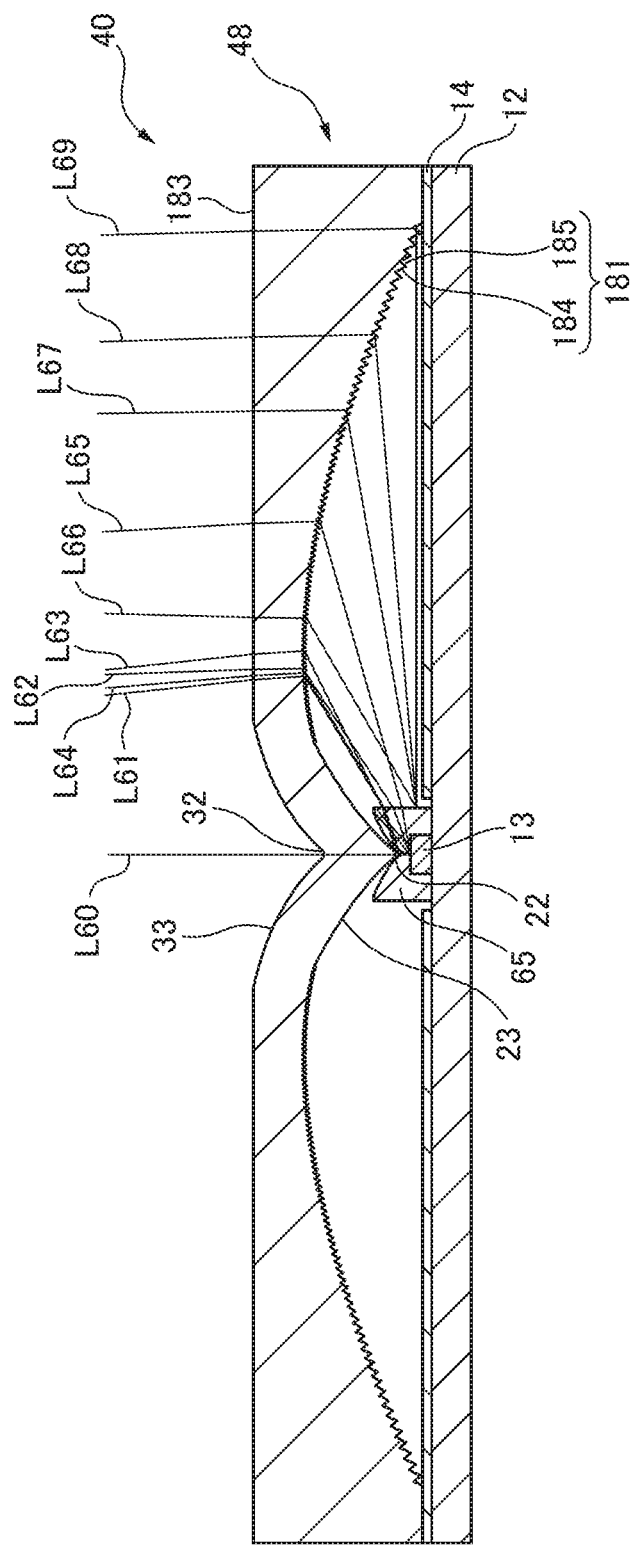
FIG. 24 is a diagram showing light paths of light radiated from the LED in the optical unit illustrated in FIG. 22.

FIG. 24 is a diagram showing light paths of light radiated from the LED 13 in the optical unit 60.

Light L60 exits upward from the LED 13 and after entering the wide-angle lens 65 from the upper-portion incidence surface 156, exits upward from the first bottom portion 153. The light L60 enters a TIR Fresnel lens 68 from the second bottom portion 22 and exits upward from the third bottom portion 32.

Light L61 to L63 exit from the LED 13 and after entering the wide-angle lens 65 from the upper-portion incidence surface 156, exit laterally from the first light exit surface 154 without interposition of the first reflection surface 152. The light L61 to L63 enter the TIR Fresnel lens 68 from the second incidence surface 184, reflect from the second reflection surface 185 on the outside of the second incidence surface 184, and exit upward from the second light exit surface 183. Light L65 to L69 exit laterally from the LED 13 and after entering the wide-angle lens 65 from the side-portion incidence surface 157, exit laterally from the first light exit surface 154. The light L65 to L69 enter the TIR Fresnel lens 68 from the second incidence surface 184, reflect from the second reflection surface 185 adjacent to the outside of the second incidence surface 184 from which the light L65 to L69 have entered, and exit upward from the second light exit surface 183.

In the light-emitting device 6, the deviation of the optical axis between the LED 13 and the wide-angle lens 65 may be reduced by integrating the wide-angle lens 65 and the LED 13. Further, while it is necessary to increase the distance from the upper-portion incidence surface 156 to the first bottom portion 153 to a certain degree for the wide-angle lens 15 in order to maintain strength, strength may be secured even if the distance from the upper-portion incidence surface 656 to the first bottom portion 153 is reduced since the wide-angle lens 65 is integrated with the LED 13. Thus, thickness of the light-emitting device 6 may be reduced as well as the size of the wide-angle lens 65 may be reduced.

Further, in the wide-angle lens 65, the LED 13 and the wide-angle lens 65 optically adhere close to each other, and therefore the reflection loss at the light-emitting surface (upper surface and side surface) of the LED 13 and the first incidence surface 651 is reduced drastically and the light emission efficiency of the light-emitting device improves. In the wide-angle lens 65, the refraction at the light-emitting surface and the first incidence surface 651 is different from the case where the wide-angle lens 15 is used. Then, the light distribution of the wide-angle lens 65 is somewhat different from the light distribution when the wide-angle lens 15 is used. Thus, in order to obtain the light distribution equivalent to that of the wide-angle lens 15, it is recommended to adjust the outer shape of the wide-angle lens 65.

Here, the light path of the wide-angle lens 15 is explained supplementarily by FIG. 25. FIG. 25 is a diagram showing light paths of light radiated from the LED 13 in the wide-angle lens 15 mounted on the light-emitting devices 1 to 5.

As shown in FIG. 25, light L600 emitted in the directly upward direction from the center of the upper surface of the LED 13 passes through the upper-portion incidence surface 156 and the first bottom portion 153 and continues to travel in the vertical direction. The light path of the light L600 coincides with the optical axis of the LED 13 and the wide-angle lens 15. Light L601 emitted in the obliquely upward direction from the center of the upper surface of the LED 13 is refracted at the upper-portion incidence surface 156 and after totally reflecting from the first reflection surface 152, exits in the horizontal direction from the first light exit surface. Light L602 emitted in the directly upward direction from the end portion of the upper surface of the LED 13 is refracted at the upper-portion incidence surface 156 and the first reflection surface 152 and exits in the vertical direction. Thus, part of light emitted from the portion other than the center of the upper surface of the LED 13 and having reached the first reflection surface 152 reflects totally from the first reflection surface 152 and the rest of the light transmits the first reflection surface 152. Further, part of light produced inside the LED 13 reflects from the interface between the light-emitting surface (upper surface and side surface) and air. Furthermore, part of light emitted from the LED 13 reflects from the interface between air and the first incidence surface 151. Thus, in the wide-angle lens 15, an air layer is interposed between the LED 13 and the wide-angle lens 15, and therefore the reflection loss occurs.

(Light-Emitting Device According to Seventh Embodiment)

Figure 26:
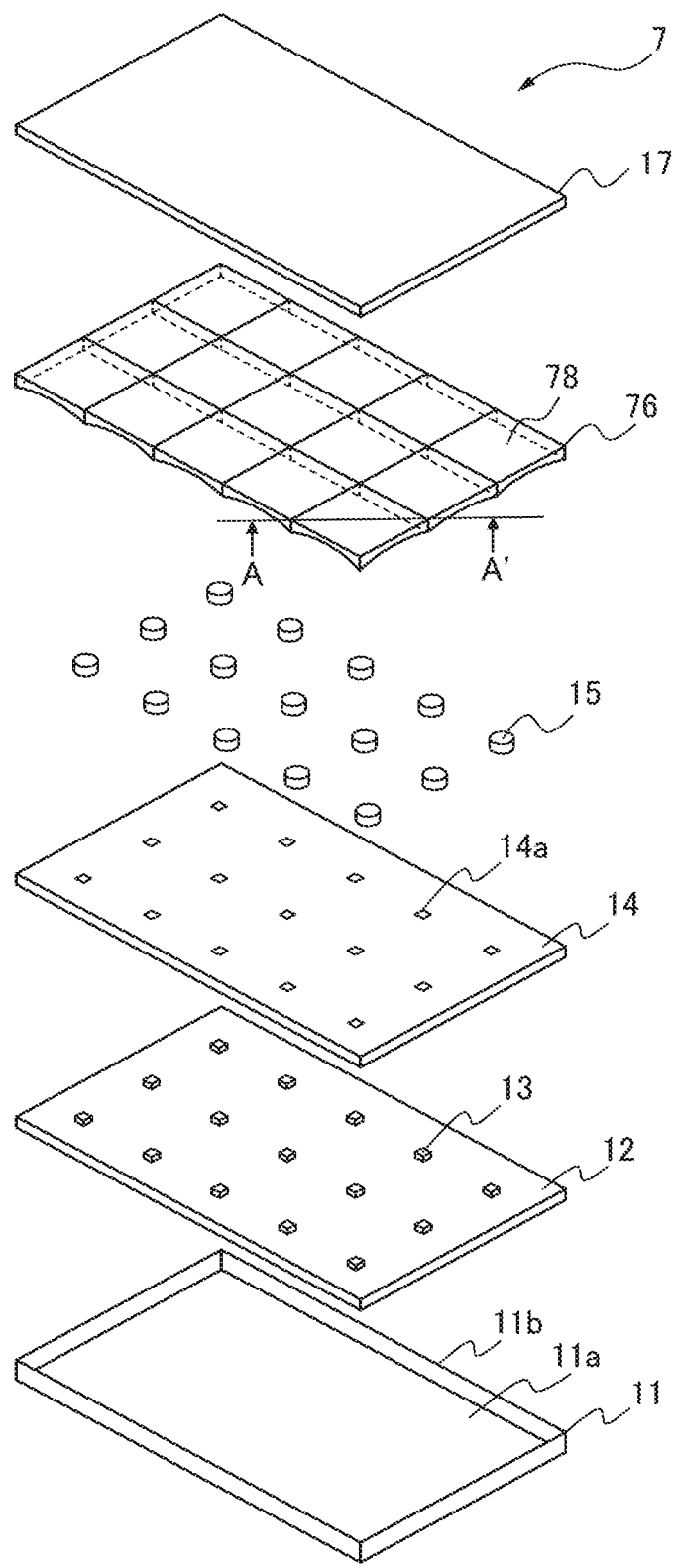
FIG. 26 is an exploded perspective diagram of a light-emitting device according to a seventh embodiment.

FIG. 26 is an exploded perspective diagram of a light-emitting device 7 according to a seventh embodiment.

The light-emitting device 7 differs from the light-emitting device 4 in having a lens sheet 76 in place of the lens sheet 46. The configurations and functions of the components of the light-emitting device 7 except for the lens sheet 76 are the same as the configurations and functions of the components of the light-emitting device 4, to which the same symbols are attached, and therefore detailed explanation is omitted here. The lens sheet 76 differs from the lens sheet 46 in having a TIR Fresnel lens 78 formed as a separate lens from one another in place of the TIR Fresnel lens 48. Similar to the TIR Fresnel lens 48, each TIR Fresnel lens 78 formed as a separate lens from one another is arranged so as to cover the one LED 13 and the one wide-angle lens 15 and the TIR Fresnel lenses 78 are arrayed in three rows and in five columns in the lens sheet 76.

(Optical Unit According to Seventh Embodiment)

FIG. 27 is a sectional diagram of one optical unit 70 drawn along an AA' line in FIG. 26. The optical unit 70 has the one LED 13, the wide-angle lens 15 covering the LED 13, and the TIR Fresnel lens 78 covering the wide-angle lens 15. In FIG. 27, part of the circuit substrate 12 and the reflection plate 14 corresponding to the optical unit 70 is also described.

The TIR Fresnel lens 78 differs from the TIR Fresnel lens 48 in having a second reflection surface 71 in place of the second reflection surface 185. The TIR Fresnel lens 78 further differs from the TIR Fresnel lens 48 in having a third light exit surface 72 arranged along the outer edge of the second light exit surface 183. The configurations and functions of the components of the TIR Fresnel lens 78 except for the second reflection surface 71 and the third light exit surface 72 are the same as the configurations and functions of the components of the TIR Fresnel lens 48, to which the same symbols are attached, and therefore detailed explanation is omitted here.

At least part of the second reflection surface 71 is formed so that light that enters the second incidence surface 184 exits from the third light exit surface 72 and the light that enters the second incidence surface 184 is reflected to the outside.

The third light exit surface 72 is arranged along the outer edge of the second light exit surface 183 and light that reflects from at least part of a plurality of second reflection surfaces 71 is refracted in the vertical direction and exits. The third light exit surface 72 is formed by performing chamfering (section is ¼ of a circle) for the periphery (corner) of the second light exit surface 183.

FIG. 28 is a diagram showing light paths of light radiated from the LED 13 in the optical unit 70.

Light L71 and L72 exit upward from the LED 13 and after entering the wide-angle lens 15 from the upper-portion incidence surface 156, exit upward from the first bottom portion 153. The light L71 enters the TIR Fresnel lens 78 from the second bottom portion 22 and exits upward from the third bottom portion 32. The light L72 enters the TIR Fresnel lens 78 from the third incidence surface 23, reflects from the third reflection surface 33, and exits from the side wall of the TIR Fresnel lens 78 after passing through the inside of the TIR Fresnel lens 78 while reflecting. Light L73 to L75 exit upward from the LED 13 and after entering the wide-angle lens 15 from the upper-portion incidence surface 156, reflect from the first reflection surface 152 and exit obliquely laterally from the first light exit surface 154. The light L73 to L75 enter the TIR Fresnel lens 78 from the second incidence surface 184 at the incidence/reflection surface 181, reflect from the second reflection surface 71 adjacent to the outside of the second incidence surface 184 from which the light L73 to L75 have entered, and exit upward from the second light exit surface 183.

Light L76 exits from the LED 13 and after entering the wide-angle lens 15 from the upper-portion incidence surface 156, exits laterally from the first light exit surface 154 without interposition of the first reflection surface 152. The light L76 enters the TIR Fresnel lens 78 from the second incidence surface 184 on the inside at the incidence/reflection surface 181, reflects from the second reflection surface 71 on the outside of the second incidence surface 184, and exits upward from the second light exit surface 183. Light L77 traveling laterally exits laterally from the LED 13 and after entering the wide-angle lens 15 from the side-portion incidence surface 157, exits laterally from the first light exit surface 154. The light L77 enters the TIR Fresnel lens 78 from the second incidence surface 184 on the outside at the incidence/reflection surface 181, reflects from the second reflection surface 71 adjacent to the outside of the second incidence surface 184 from which the light L77 has entered, and exits upward from the second light exit surface 183.

Light L78 exits upward from the LED 13 and after entering the wide-angle lens 15 from the upper-portion incidence surface 156, reflects from the first reflection surface 152 and exits obliquely laterally from the first light exit surface 154. The light L78 enters the TIR Fresnel lens 78 from the second incidence surface 184 at the incidence/reflection surface 181, reflects to the outside from the second reflection surface 71 adjacent to the outside of the second incidence surface 184 from which the light L78 has entered, and reaches the third light exit surface 72. The light L78 having reached the third light exit surface 72 is refracted at the third light exit surface 72 and exits upward.

In the light-emitting device 7, the TIR Fresnel lenses 78 formed individually make up the lens sheet 76 by being connected with one another. If the third light exit surface 72 does not exist in the TIR Fresnel lens 78, internal reflection increases in the corner portion of the TIR Fresnel lens 78 and the connecting portion with the adjacent TIR Fresnel lens 78 becomes dark. On the other hand, in the TIR Fresnel lens 78 of the light-emitting device 7, the third light exit surface 72 is arranged along the outer edge of the second light exit surface 183, and therefore the internal reflection in the corner portion of the TIR Fresnel lens 78 is reduced drastically and the luminance at the connecting portion may be prevented from becoming low.

In the light-emitting devices according to the embodiments explained hitherto, the prism sheet for directivity control may be omitted, since the directivity is controlled by using the TIR Fresnel lens having strong directivity. Further, in the light-emitting devices according to the embodiments, the control of directivity is performed by one-time reflection by the TIR Fresnel lens, and therefore the loss of light may be suppressed to a minimum. Furthermore, in the light-emitting devices according to the embodiments, local dimming is enabled by individually performing lighting control of the optical unit. Still furthermore, in the light-emitting devices according to the embodiments, the hot spot formed directly over the LED may be reduced.

The shape of the upper-portion incidence surface and the side-portion incidence surface does not need to have a tapered shape. However, in the light-emitting devices according to the embodiments, the upper-portion incidence surface of the LED light source housing unit in which the LED is housed has a curved surface convex downward or a tapered shape so that reflection from the first reflection surface of the wide-angle lens occurs efficiently. Thus, it is preferable to form the tapered shape of the side-portion incidence surface of the LED light source housing unit in which the LED is housed so that light enters the TIR Fresnel lens efficiently and light exiting from the TIR Fresnel lens becomes uniform. Further, the light-emitting devices according to the embodiments may applied as a light-emitting device for a large-sized liquid crystal display device, not only as a light-emitting device for a medium/small-sized liquid crystal display device.

In the light-emitting devices according to the embodiments, the optical units each including one LED, one wide-angle lens, and one TIR Fresnel lens are arrayed in the form of a plane in three rows and in five columns. The light-emitting devices according to the embodiments are not limited to this array and light-emitting devices may have a variety of sizes by freely arraying the optical units. Further, the light-emitting devices according to the embodiments may be formed into a spherical shape or a curved shape by adjusting the connecting state between the optical units and the shape of a plane.

The light-emitting devices according to the embodiments may be aspects described below.

(1) A planar light unit that illuminates a transmission-type display device from behind, characterized by including a plurality of optical units each including an LED, a wide-angle lens covering the LED, and a TIR Fresnel lens arranged at the upper portion of the wide-angle lens, and in that optical units are arrayed.

(2) The planar light unit described in (1) characterized in that the wide-angle lens includes an LED light source housing unit for housing the LED at the bottom portion.

(3) The planar light unit described in (2) characterized in that the wide-angle lens includes an upper-portion incidence surface in the LED light source housing unit and the upper-portion incidence surface has a taper.

(4) The planar light unit described in (2) or (3) characterized in that the wide-angle lens includes a side-portion incidence surface in the LED light source housing unit and the side-portion incidence surface has a taper.

The invention claimed is:

1. A light-emitting device comprising:
   an LED;
   a first optical element arranged so as to cover the LED; and
   a second optical element arranged so as to cover the first optical element, wherein
   the first optical element has:
      a first incidence surface that light radiated from the LED enters;
      a first reflection surface having a concave shape forming cone toward the first incidence surface, arranged above the first incidence surface, and totally reflecting light laterally that enters from the LED via the first incidence surface; and
      a first light exit surface arranged along the entire circumference of the first reflection surface and causing light that reflects from the first reflection surface to exit, and
   the second optical element has:
      an incidence/reflection surface formed by a plurality of second incidence surfaces arranged concentrically and entered by light that exits from the first light exit surface and a plurality of second reflection surfaces arranged alternately with the plurality of second incidence surfaces and totally reflecting light upward that enters the plurality of second incidence surfaces;
      a second light exit surface arranged above the incidence/reflection surface and causing light that reflects from the plurality of second reflection surfaces to exit; and
      a convex portion arranged at the center of a side forming the incidence/reflection surface, wherein the convex portion is inserted in the first reflection surface.

2. The light-emitting device according to claim 1, wherein the first optical element further has a first bottom portion arranged in opposition to the LED via the first incidence surface.

3. The light-emitting device according to claim 2, wherein the second optical element further has:
   a second bottom portion arranged in opposition to the LED via the first optical element; and
   a third incidence surface extending toward an inner edge of the incidence/reflection surface from the second bottom portion and entered by light that transmits at least one of the first reflection surface and the first bottom portion.

4. The light-emitting device according to claim 3, wherein the second optical element has the third incidence surface on the convex portion,
   the third incidence surface has a transmission surface arranged so as to be contained in the third incidence surface and transmitting light that transmits at least one of the first reflection surface and the first bottom portion, and
   the transmission surface is performed surface texturing.

5. The light-emitting device according to claim 2, wherein the second optical element further has:
   a third bottom portion arranged in opposition to the LED via the first bottom portion; and
   a third reflection surface extending toward an inner edge of the second light exit surface from the third bottom portion and reflecting light that enters.

6. The light-emitting device according to claim 5, wherein the second optical element further has a transmission surface arranged so as to be contained in the third reflection surface and transmitting light that transmits at least one of the first reflection surface and the first bottom portion, and
   the transmission surface is performed surface texturing.

7. The light-emitting device according to claim 1, wherein the LED is arranged by being integrated with the first optical element.

8. The light-emitting device according to claim 1, wherein at least part of the plurality of second reflection surfaces reflects light to the outside that enters the plurality of second incidence surfaces, and
   the second optical element further has a third light exit surface arranged along an outer edge of the second light exit surface and causing light that reflects from at least part of the plurality of second reflection surfaces to exit.

9. The light-emitting device according to claim 4, wherein the transmission surface is arranged concentrically.

* * * * *